United States Patent

Kagawa et al.

[11] Patent Number: 5,995,239
[45] Date of Patent: *Nov. 30, 1999

[54] FACSIMILE APPARATUS, FACSIMILE METHOD, AND FACSIMILE SYSTEM INCLUDING A MODEM FOR DETERMINING A DATA RATE

[75] Inventors: Tetsuya Kagawa; Tetsuya Kawaguchi, both of Ebina, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/833,049

[22] Filed: Apr. 3, 1997

[30] Foreign Application Priority Data

Apr. 5, 1996 [JP] Japan ................................ 8-108645
Jul. 19, 1996 [JP] Japan ................................ 8-209303

[51] Int. Cl.$^6$ .................................................. H04N 1/32
[52] U.S. Cl. ......................... 358/405; 358/468; 714/708
[58] Field of Search .................................. 358/442, 405, 358/406, 412, 468; 371/31, 32; 714/708, 747, 748; 375/225

[56] References Cited

U.S. PATENT DOCUMENTS

| | | | |
|---|---|---|---|
| 4,589,111 | 5/1986 | Adachi | 371/32 |
| 4,887,162 | 12/1989 | Arai | 371/31 |
| 5,031,179 | 7/1991 | Yoshida et al. | 371/32 |
| 5,105,423 | 4/1992 | Tanaka et al. | 371/32 |
| 5,159,465 | 10/1992 | Maemura et al. | 358/405 |
| 5,303,066 | 4/1994 | Kawaguchi | 358/434 |
| 5,351,134 | 9/1994 | Yaguchi et al. | 358/435 |

FOREIGN PATENT DOCUMENTS 6-209409  7/1994  Japan ........................ H04N 1/32

OTHER PUBLICATIONS

ITU–T Recommendation V. 34 (Oct. 1996), Series V: Data Communication Over The Telephone Network, A Modem Operating At Data Signalling Rates Of Up To 33,600 Bits For Use On The General Switched Telephone Network And On Leased Point–To–Point 2–Wire Telephone–Type Circuits.

*Primary Examiner*—Andrew W. Johns
*Attorney, Agent, or Firm*—Cooper & Dunham LLP

[57] ABSTRACT

A facsimile apparatus capable of sending and receiving image data by use of a transmission control procedure based on the G3 (Group III) standard of ITU-T (International Telecommunication Union—Telecommunication Standardization Sector) Recommendations, and a transmission control procedure based on ITU-T Recommendation V.34. Whether or not to continue resending image data is determined on the basis of a resending condition or conditions known by a transmitting station or a receiving station. The apparatus enhances efficient communication and reliability.

18 Claims, 21 Drawing Sheets

Fig. 3 PRIOR ART

TX: ....PIX(primary CH) Sh S̄h ALT  PPh MPh MPh E  PPS-EOP FLAG  "1"  PIX(primary CH).....

RX: PPh ALT  MPh MPh E  FLAG  PPR FLAG

Fig. 4 PRIOR ART

TX: ....PIX(primary CH) PPh ALT MPh MPh E  PPS-EOP FLAG  "1"  PIX(primary CH).....

RX: PPh ALT MPh MPh E  FLAG  PPR FLAG

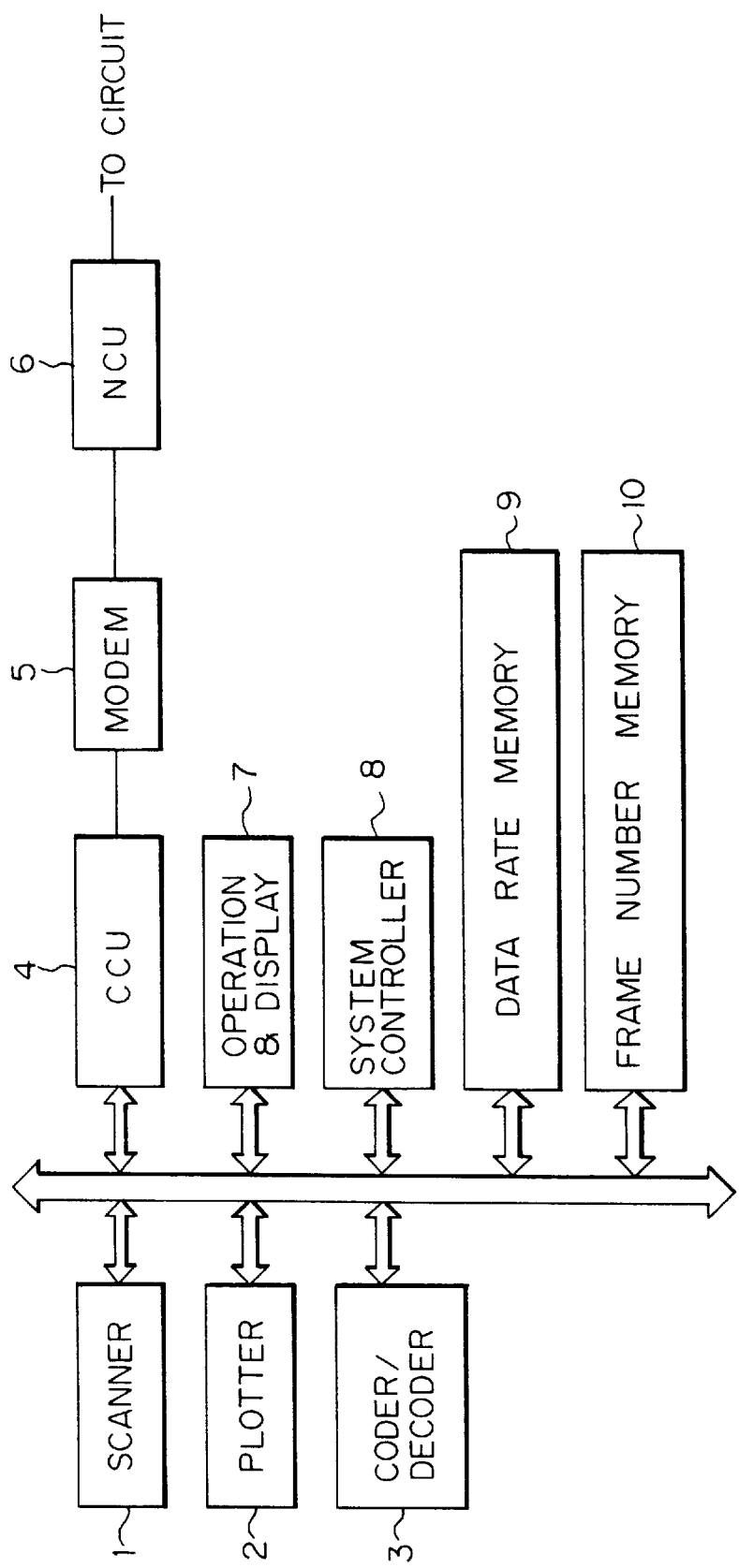

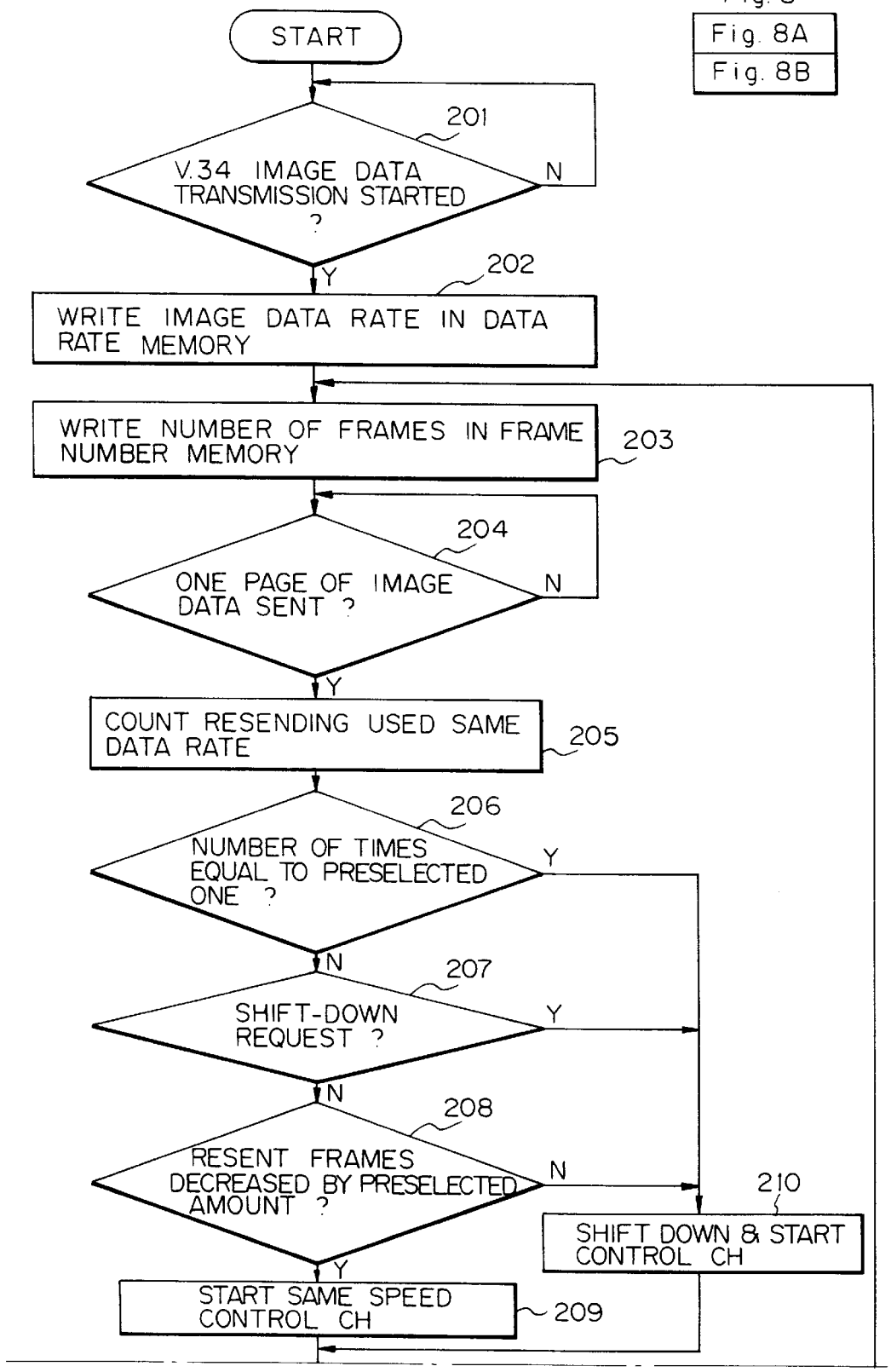

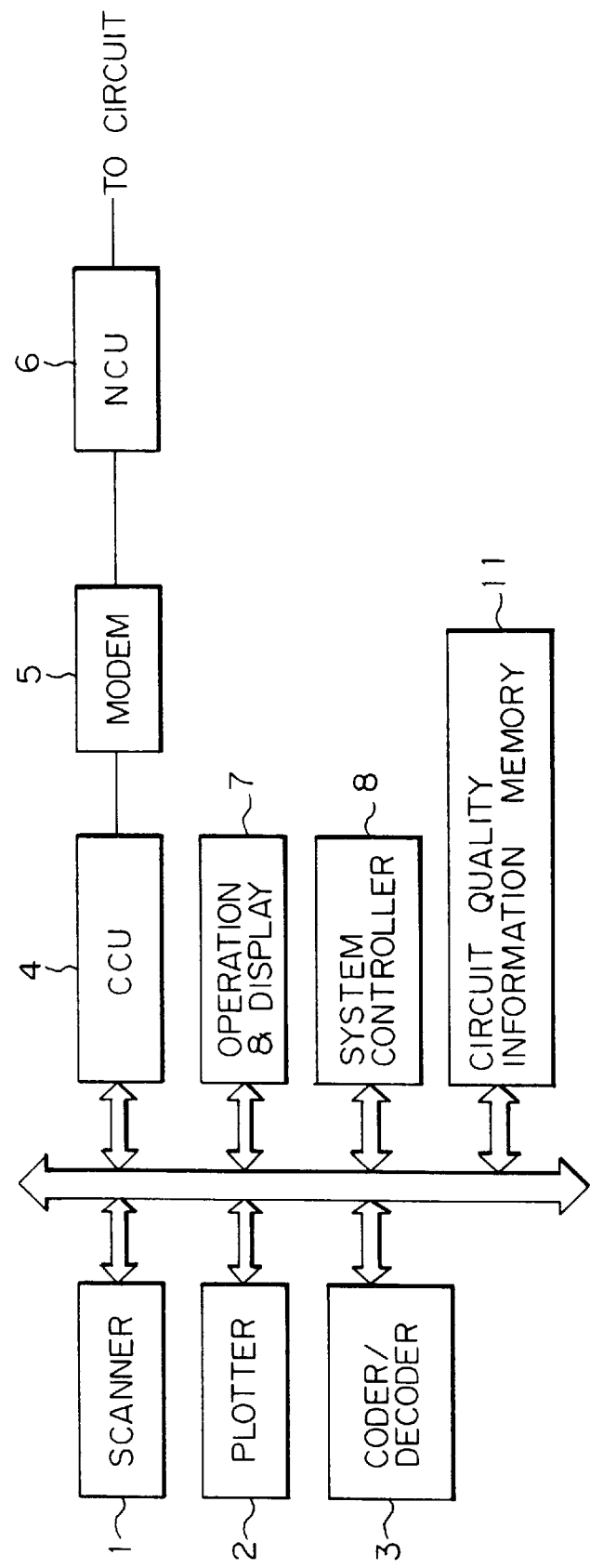

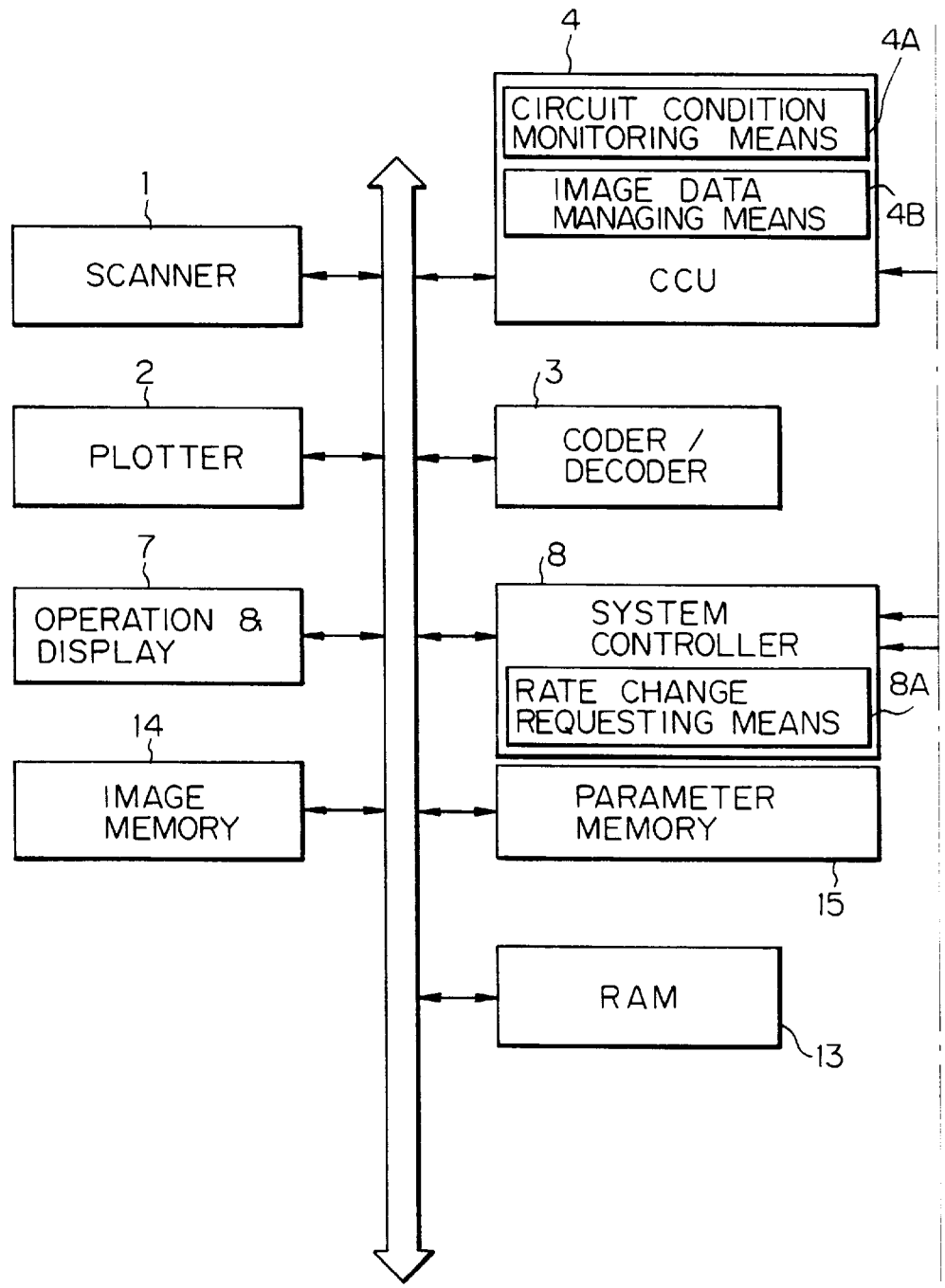

FACSIMILE APPARATUS, FACSIMILE METHOD, AND FACSIMILE SYSTEM INCLUDING A MODEM FOR DETERMINING A DATA RATE

BACKGROUND OF THE INVENTION

The present invention relates to a facsimile apparatus capable of transmitting and receiving image data by use of a transmission control procedure based on the G3 (Group III) standard of ITU-T (International Telecommunication Union—Telecommunication Standardization Sector) and a transmission control procedure based on ITU-T Recommendation V.34. More particularly, the present invention is concerned with a facsimile apparatus capable of selecting the data rate of a modem automatically in order to increase the communication rate and reliability.

It is a common practice with a G3 facsimile apparatus to cause a transmitting station to send, at the last stage of Phase B, a training signal of a transmission rate particular to image data to be sent to a receiving station, thereby determining a transmission rate. Specifically, the transmitting and receiving stations try to send image data at the highest possible transmission rate. If the transmission at such a transmission rate fails, the two stations shift down the rate to one allowing image data to be successfully sent. In this manner, it has been customary to only shift down the transmission rate in accordance with the circumstance.

Japanese Patent Laid-Open Publication No. 6-209409 discloses a facsimile apparatus capable of transmitting and receiving image data in ECM (Error Correction Mode). This apparatus sends a PPS-EOM (Pulse Per Second-End Of Message) signal at the end of transmission of one page, returns to Phase B, sets up a transmission rate higher than the rate assigned to the above page, and then executes training check. With this apparatus, it is possible to increase the transmission rate in accordance with the circumstance. However, the problem is that the apparatus does not allow a receiving station to change the transmission rate, and simply relies on the accidental occurrence of an error in changing the transmission rate.

On the other hand, a procedure supplementary to the G3 transmission control procedure, e.g., the procedure prescribed by ITU-T Recommendation V.34, allows a receiving facsimile station to shift down or shift up the transmission rate while the transmission of image data is under way.

Specifically, ITU-T Recommendation V.34 pertains to modems operable at data rates of up to 28,800 bps (bits per second) and applicable to general telephone networks and two-wire point-to-point telephone type exclusive circuits. While Recommendation kV.34 prescribes a modem rate redetermining protocol between pages, how such a protocol is applied is open to choice. Generally, ITU-T ECM is essential when image data are sent by the ITU-T Recommendation V.34 control procedure. With ECM, the transmitting station can automatically resend the error frames included in image data. Specifically, the receiving station informs the transmitting station of the positions of error frames included in received image data, requesting the transmitting station to resend such frames. When errors do not disappear despite repeated resending, the transmitting station executes a shift-down protocol for lowering the data rate and again resends the error frames.

However, in the ITU-T Recommendation V.34 control procedure, the data rate is not determined by the protocol, but determined by a modem sequence at the beginning of communication. Moreover, because a shift-down procedure is executed by a control channel between pages before the start of protocol, a shift-down cannot be determined on the basis of resend request information sent from the receiving station. This obstructs the increase in communication efficiency and the decrease in communication cost. While a shift-down request can be sent not only from the transmitting station but also from the receiving station, a parameter or parameters on which the shift-down request is based are indefinite. As a result, the shift-down is effected arbitrarily.

SUMMARY OF THE INVENTION

It is therefore an object of the present invention to provide a facsimile apparatus capable of increasing the communication efficiency and reliability by determining, based on a resending condition or conditions known by a transmitting station or a receiving station, whether or not to shift down the transmission rate and continue resending.

It is another object of the present invention to provide a facsimile apparatus capable of shifting down the transmission rate adequately so as to reduce errors, and thereby enhancing efficient and reliable communication.

In accordance with the present invention, in a facsimile apparatus of the type including a modem capable of determining a data rate for image data communication in accordance with transmission quality of a communication circuit, and using a protocol allowing, at the beginning of a control channel for allowing a transmitting side and a receiving side to interchange control signals including an error frame resending function and following a primary channel assigned to image data communication, either one of the transmitting side and the receiving side to execute a shift-down procedure for shifting down the data rate, a data rate detecting section detects a data rate at the time of error frame resending. A counting section counts the number of times of resending effected at the same data rate. A determining section determines whether or not the resending effected at the same data rate has been repeated a preselected number of times. A controller executes the shift-down procedure when the resending at the same data rate has been repeated the preselected number of times.

Also, in accordance with the present invention, in a facsimile apparatus of the type described, a reading section reads information stored in the modem and relating to the circuit quality of the communication circuit occupied. A determining section determines the quality of the communication circuit on the basis of the information. A controller executes the shift-down procedure when the quality is lower than a preselected value.

Further, in accordance with the present invention, a facsimile apparatus for performing facsimile communication based on the G3 standard transmission control procedure and supplementary procedure includes a circuit condition monitoring section for monitoring, during the receipt of image data, a circuit condition which may change signals. A rate change requesting section causes a receiving side to send, after or during the receipt of one page of image data, a signal for requesting a shift-down or a shift-up of a transmission rate on the basis of the circuit condition monitored by the circuit condition monitoring section.

BRIEF DESCRIPTION OF THE DRAWINGS

The above and other objects, features and advantages of the present invention will become more apparent from the following detailed description taken with the accompanying drawings in which:

FIG. 3 shows a specific protocol sequence for resend request control (shift-down request from a transmitting station) particular to Recommendation V.34 communication;

FIG. 4 shows a specific protocol sequence for resend request control (shift-down request from a transmitting station) particular to Recommendation V.34 communication;

FIG. 7 is a block diagram schematically showing a second embodiment of the present invention;

FIGS. 8A and 8B depict a flowchart demonstrating a specific operation of the second embodiment;

FIG. 9 is a block diagram schematically showing a third embodiment of the present invention;

FIGS. 13A and 13B depict a block diagram schematically showing a fifth embodiment of the present invention;

DESCRIPTION OF THE PREFERRED EMBODIMENTS

Figure 1:
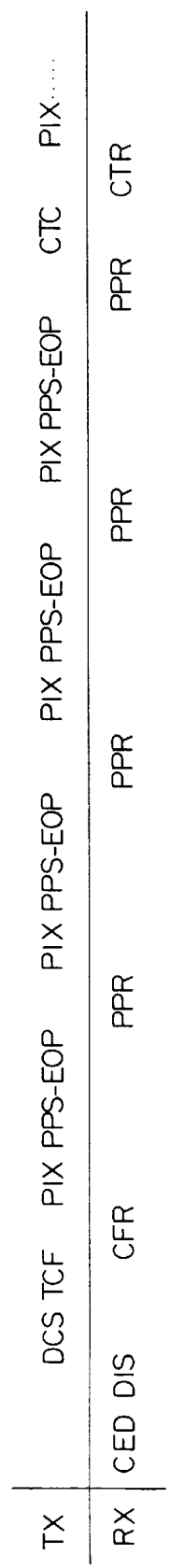
FIG. 1 shows a specific protocol sequence for a frame resend request and shift-down procedure particular to a conventional ECM communication.

To better understand the present invention, reference will be made to conventional facsimile communication technologies. FIG. 1 shows a specific error frame resend request and shift-down protocol sequence based on the conventional ECM system. As shown, when an error exists in a received image data frame, a receiving station RX sends an error frame position to a transmitting station TX in the form of a PPR (Partial Page Request) signal. In response, the transmitting station TX resends the requested frame automatically. On receiving the PPR signal four consecutive times, the transmitting station TX sends to the receiving station RX a CTC (Continue To Correct) signal for shift-down by its own decision.

Figure 2:
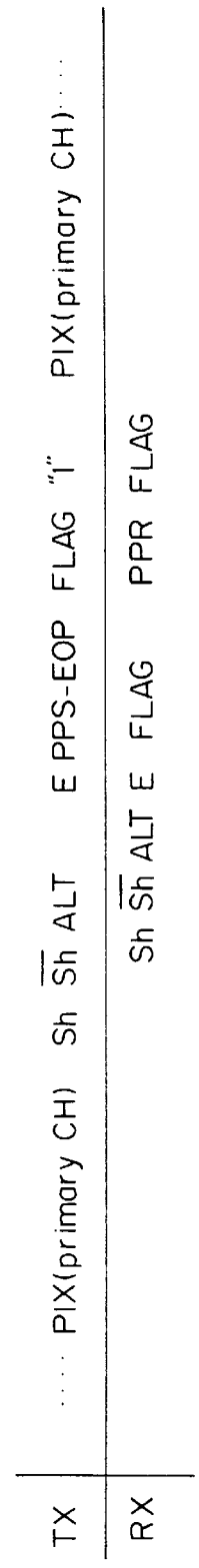
FIG. 2 shows a specific protocol sequence for resend request control (without shift-down) particular to Recommendation V.34 communication.

FIGS. 2, 3 and 4 each show a particular resend request protocol sequence based on Recommendation V.34. In FIG. 2, although the receiving station RX sends the PPR signal or resend request to the transmitting station TX, a shift-down is not effected in a control channel start-up sequence following the transmission of image data PIX over a primary channel. In FIG. 3, the receiving station RX starts up a shift-down (shift-up also available). The sequence shown in FIG. 3 noticeably differs from the conventional protocol sequence in that the data rate of an image data portion is determined by a modulation parameter (MPh) sequence, and then PPS-EOP and PPR signals are sent. In FIG. 4, the transmitting station TX starts up a shift-down (shift-up also available).

As for the MPh signal shown in FIG. 3 or 4, the preselected bits of the signal can be used to redetermine the data rate of the image data. The MPh sequence is interchanged between modems at the time of start-up and during control channel resynchronization. The MPh sequence includes a modulation parameter to be used for data mode transmission.

However, in the ITU-T Recommendation V.34 control procedure, the data rate is not determined by the protocol, but determined by a modem sequence at the beginning of communication. Moreover, because a shift-down procedure is executed by a control channel between pages before the start of protocol, a shift-down cannot be determined on the basis of resend request information sent from the receiving station. This obstructs the increase in communication efficiency and the decrease in communication cost. While a shift-down request can be sent not only from the transmitting station but also from the receiving station, a parameter or parameters on which the shift-down request is based are indefinite. As a result, the shift-down is effected arbitrarily, as stated earlier.

Preferred embodiments of the facsimile apparatus in accordance with the present invention will be described hereinafter. In the embodiments, identical reference numerals designate identical units.

1st Embodiment

Figure 5:
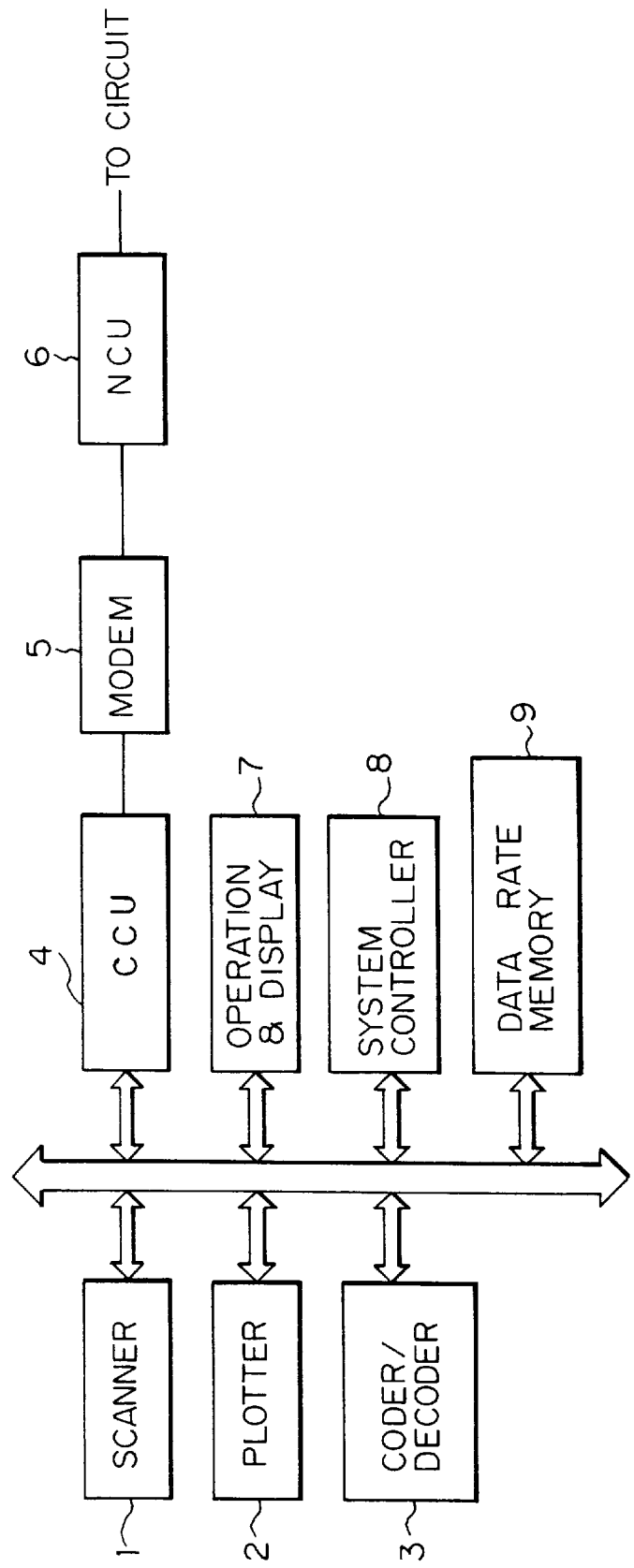
FIG. 5 is a block diagram schematically showing a first embodiment of the facsimile apparatus in accordance with the present invention.

Referring to FIG. 5, a facsimile apparatus embodying the present invention is shown in a system configuration. As shown, the apparatus includes a scanner 1 for reading image data out of a document by scanning it. A plotter 2 records received image data or image data output by the scanner 1. A coder/decoder 3 selectively codes the image data output from the scanner 1 by compression or decodes the received image data by expansion. A communication control unit (CCU) 4 executes protocol control. A modem 5 selectively modulates or demodulates communication data and has a communicating function satisfying ITU-T Recommendation V.34. A network control unit (NCU) 6 is connected to a general telephone network in order to control the origination and receipt of a call. An operation and display panel 7 interfaces the apparatus to the operator. A system controller 8 executes not only preselected facsimile control but also processing and control for implementing the present invention which will be described. A data rate memory 9 stores a data rate automatically determined by the modem 5 together with the number of times of transmission. A shift-down is determined on the basis of the data rate occuring at the time of resending and the number of times of resending stored in the data rate memory 9. Specifically, a shift-down may be effected when resending is repeated three consecutive times at the same data rate.

Figure 6A:
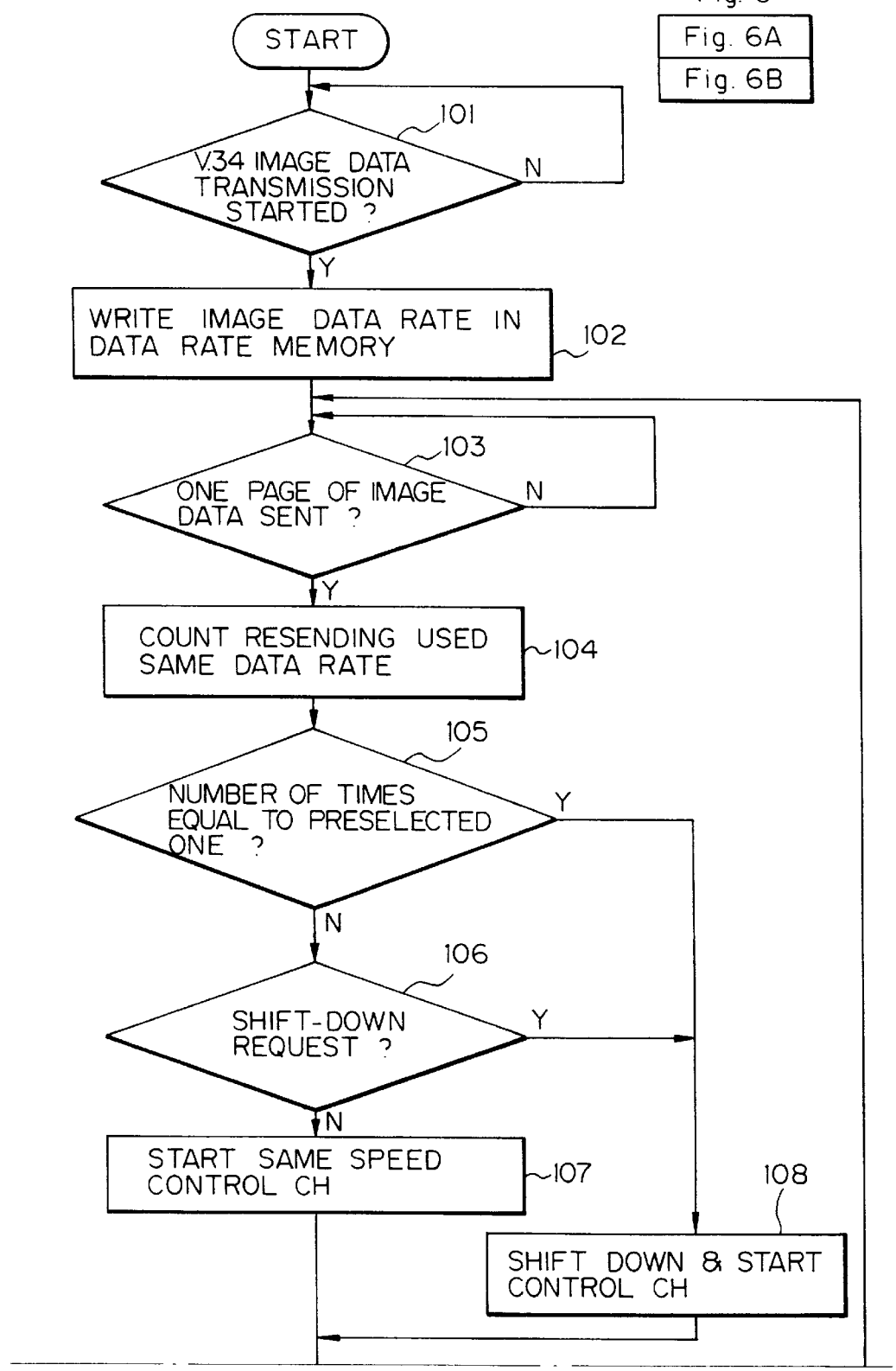
FIGS. 6A and 6B depict a flowchart demonstrating a specific operation of the first embodiment.
Figure 6B:
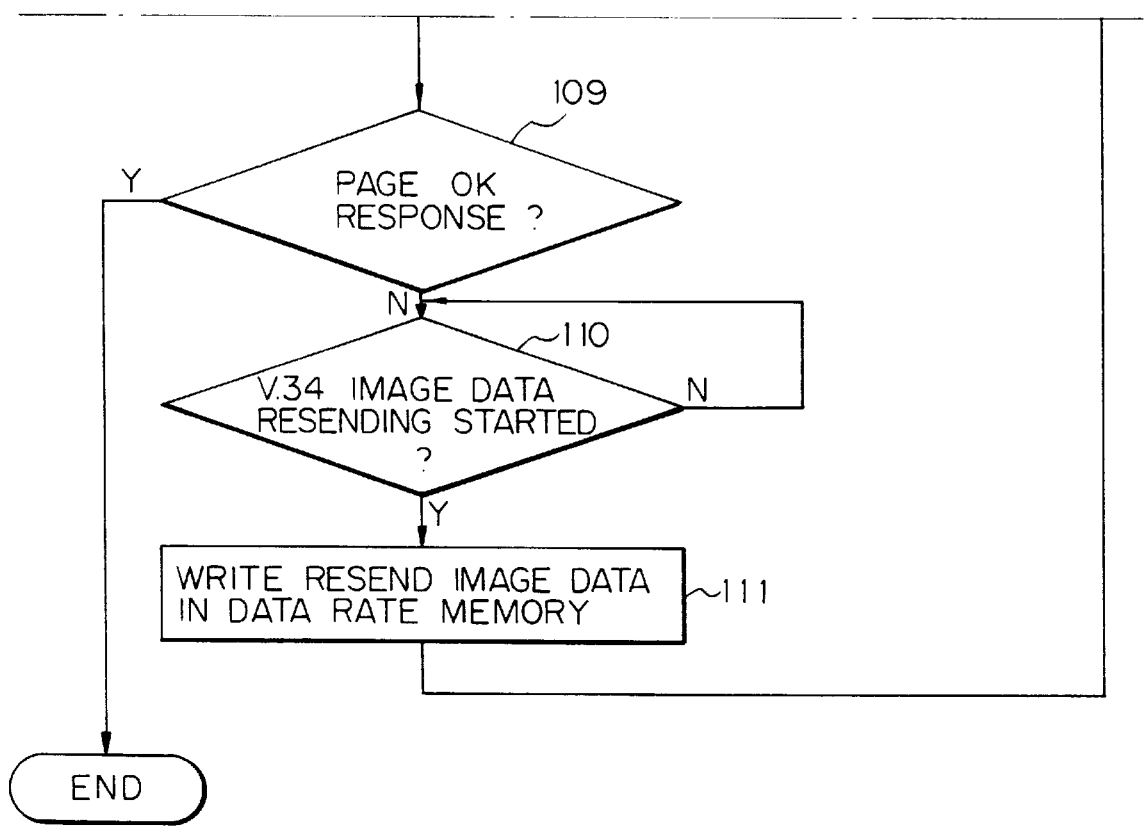

Reference will be made to FIGS. 6A and 6B for describing a specific operation of the above apparatus implemented as a transmitting station. As shown, when image data begins to be sent on the basis of Recommendation V.34 (Y, step 101), a data rate of the image data is read out of the modem 5 and then written to the data rate memory 9 together with the number of times of transmission (step 102). After one page of image data have been fully sent (Y, step 103), the number of times of resending using the same data rate is determined on the basis of the data stored in the data rate memory 9 (step 104). Then, whether or not the above number of times has reached a preselected number of times, (e.g., three times) is determined (step 105). At this stage of procedure, no image data have been resent, so that the answer of the step 105 is negative (N). Subsequently, in a step 106, whether or not the transmitting station has received a shift-down request from a receiving station is determined. If the answer of the step 106 is N, a control channel protocol begins at the same data rate (step 107). If the answer of the step 106 is Y, a preselected shift-down procedure is executed, and then the control channel protocol begins (step 108).

After the step 107 or 108, a determination is made whether the transmitting station has received from the receiving station an answer showing whether the receiving station has successfully received one page of image data (step 109). If the answer of the step 109 is Y, the transmission of the page ends. Assume that the receiving station has failed to receive the page and has sent to the transmitting station a PPR signal indicative of a frame of image data needing resending (N, step 109). Then, image resending procedure based on Recommendation V.34 begins to resend the requested frame (Y, step 110). At this instant, the data rate of the image data resent is read out of the modem 5 and then written to the data rate memory 9 (step 111). The program returns from the step 111 to the step 103.

Assume that the number of times of resending using the same data rate has reached the preselected number of times, e.g., three times (Y, 105). Then, the step 108 is executed to perform the shift-down procedure and to begin the control channel protocol in the same manner as when the shift-down request is received from the receiving station.

As stated above, the illustrative embodiment allows the transmitting station to determine whether or not to continue resending in accordance with its resending condition. Therefore, the transmitting station can determine whether it should resend the image data at the same data rate or whether it should resend it after shifting down the transmission rate. This increases the communication efficiency and reduces the communication cost.

2nd Embodiment

FIG. 7 shows a second embodiment of the present invention similar to the first embodiment except for the following. The first embodiment determines whether or not to shift down the transmission rate on the basis of how many times error frames have been resent at the same data rate, as stated above. This allows resending to be effected in matching relation to circuit conditions, and thereby enhances efficient communication. However, when the number of error frames does not decrease despite the resending in the absence of a shift-down request, the transmitting station shifts down the transmission rate after repeating resending the preselected number of times. In such a case, the expected increase in communication efficiency may not be achievable.

In light of the above, the system shown in FIG. 7 includes a frame number memory 10 in addition to the units shown in FIG. 5. The frame number memory 10 is used to store the number of frames to be sent. This embodiment executes the shift-down procedure when either the number of times of resending using the same data rate and stored in the data frame memory 9 or the decrease in the number of frames resent and stored in the frame number memory 10 satisfies a preselected condition. The condition regarding the number of times of resending is the same as in the first embodiment. As for the frames, the number of frames sent last time and the number of frames sent this time are compared. If the resulting difference or decrement is short of a preselected threshold, the embodiment executes the shift-down procedure. For example, if 100 frames are sent first, and then ten frames are sent, the embodiment executes the shift-down procedure.

Figure 8B:
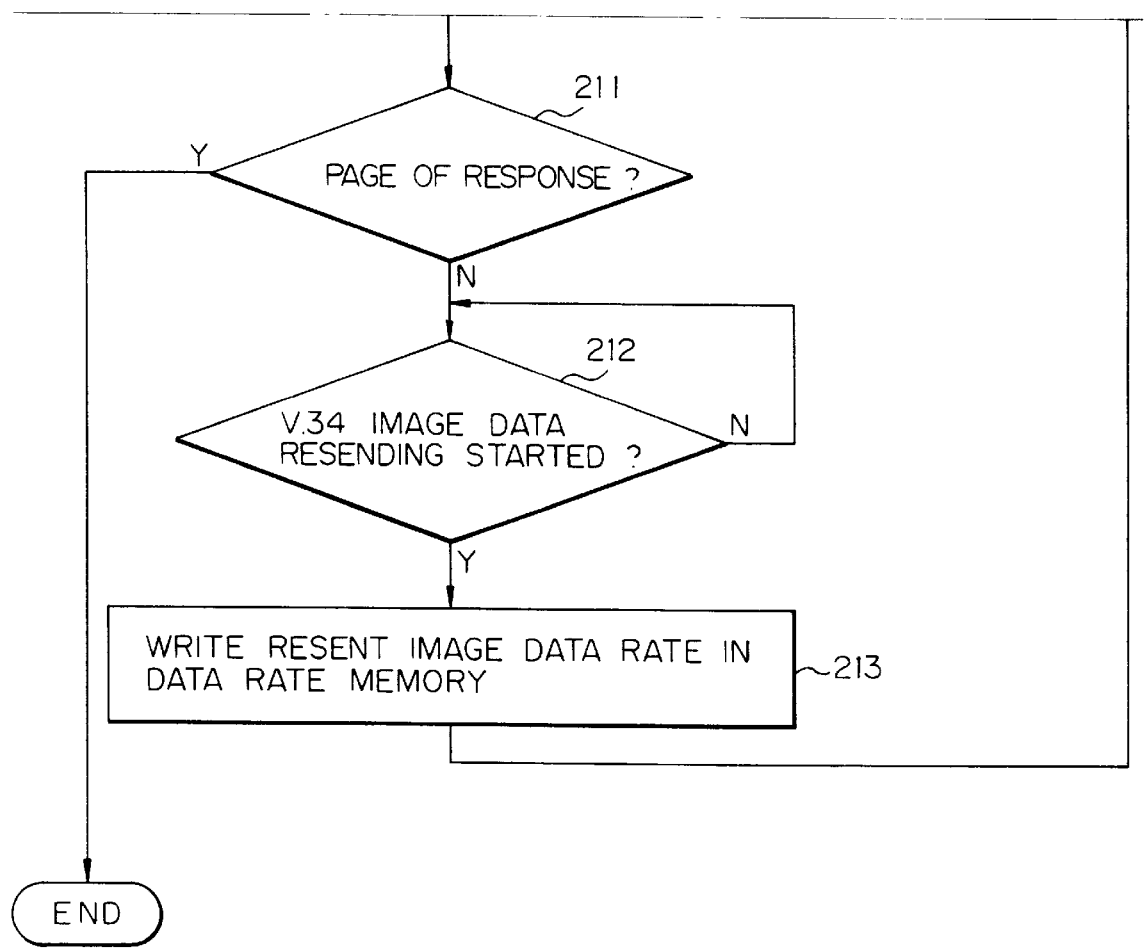

FIGS. 8A and 8B demonstrate a specific operation of the second embodiment. Briefly, the number of frames to be sent is stored at the beginning of transmission and then compared at the end of the transmission. If either one of the above conditions coincides with a preselected condition, the shift-down procedure is effected.

Specifically, as in the first embodiment, when image data begins to be sent on the basis of Recommendation V.34 (Y, step 201), a data rate of the image data is read out of the modem 5 and then written to the data rate memory 9 together with the number of times of transmission (step 202). In addition, the number of frames to be sent is written to the frame number memory 10 (step 203). After one page of image data have been fully sent (Y, step 204), the number of times of resending using the same data rate is determined on the basis of the data stored in the data rate memory 9 (step 205). Then, whether or not the above number of times has reached a preselected number of times, (e.g., three times) is determined (step 206). At this stage of procedure, no image data have been resent, so that the answer of the step 206 is N. Subsequently, in a step 207, whether or not the transmitting station has received a shift-down request from a receiving station is determined. If the answer of the step 207 is N, a determination is made whether or not the number of resent frames has decreased by a preselected amount (step 208). At this stage, no frames have been resent to the receiving station (Y, step 208), so that the control channel protocol begins at the same data rate (step 209). On the other hand, if the answer of the step 207 is Y, a preselected shift-down procedure is executed, and then the control channel protocol begins (step 210).

After the step 209 or 210, a determination is made whether or not the transmitting station has received from the receiving station an answer showing whether or not the receiving station has successfully received one page of image data (step 211). If the answer of the step 211 is Y, the transmission of the page ends. Assume that the receiving station has failed to receive the page and has sent to the receiving station a PPR signal indicative of frames needing resending (N, step 211). Then, an image resending procedure based on Recommendation V.34 begins to resend the requested frame (Y, step 212). At this instant, the data rate of the resent image data is read out of the modem 5 and then written to the data rate memory 9 (step 213). The program returns from the step 213 to the step 203.

Assume that the number of times of resending using the same data rate has reached the preselected number of times, e.g., three times (Y, step 206). Then, the step 210 is executed to perform the shift-down procedure and to begin the control channel protocol in the same manner as when the shift-down request is received from the receiving station. Assume that although the number of times of resending is short of the preselected value, and a shift-down request from the receiving station is absent, the number of resent frames does not decrease by the preselected amount. Then, the step 208 is followed by the step 210 for shifting down the communication rate and then executing the control channel protocol.

As stated above, even when a shift-down request from the receiving station is absent, the embodiment allows the transmitting station to effect shift-down by its own decision if the number of resent frames does not decrease.

3rd Embodiment

Referring to FIG. 9, a third embodiment to be described is implemented as a receiving station. How the receiving station sends a shift-down request will be described with reference to FIG. 9. It has been customary with a facsimile apparatus to allow some circuit quality information to be read out as a criterion indicative of the receipt condition of image data. The third embodiment or receiving station reads such circuit quality information, compares it with any suitable threshold, and then begins a shift-down procedure. The rest of the construction of the third embodiment is identical with the first embodiment.

Figure 10:
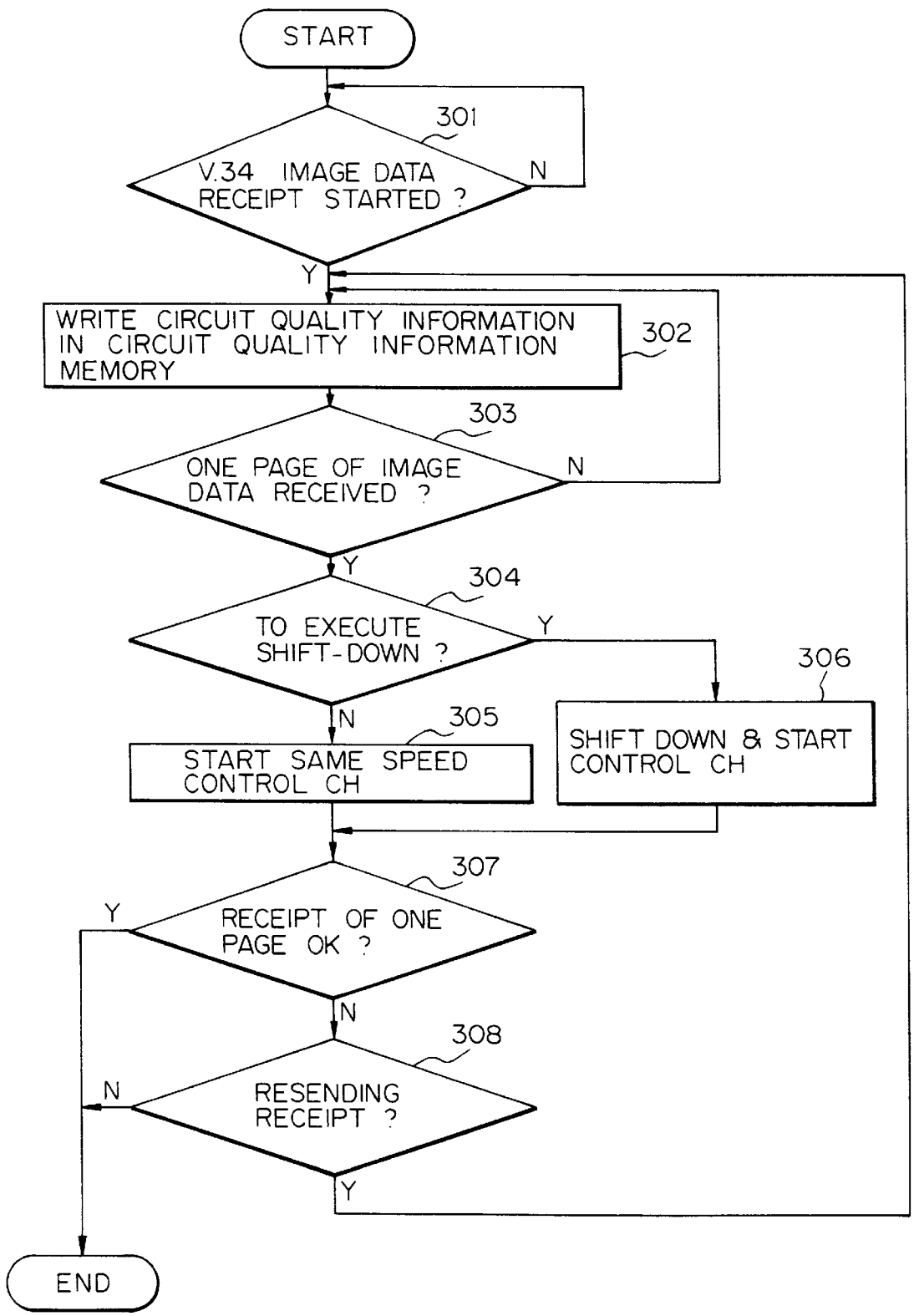
FIG. 10 is a flowchart demonstrating a specific operation of the third embodiment.

A specific operation of this embodiment will be described with reference to FIG. 10. As shown, when the receipt of image data based on Recommendation V.34 begins (Y, step 301), circuit quality information is read out of the modem 5 and then written to a circuit information memory 11 (step 302). In the illustrative embodiment, the circuit quality information is read at preselected intervals while the memory 11 is sequentially updated with the lowest quality value (N, step 303 to step 302). When one page of image data is fully received (Y, step 303), the lowest channel quality value stored in the memory 11 is read out and then compared with a preselected threshold. Whether or not to execute a shift-down procedure is determined on the basis of the result of comparison (step 304). If the circuit quality is higher than the threshold (N, step 304), a control channel protocol begins at the same data rate (step 305). On the other hand, if the circuit quality is short of the threshold (Y, step 304), the communication rate is shifted down, and then the control channel protocol begins (step 306).

After the start of the control protocol at the step 305 or 306, whether or not the one page of image data have been successfully received is determined (step 307). If the answer of the step 307 is Y, the receipt of the page ends. If the answer of the step 307 is N, whether or not the receiving station can send a PPR signal indicative of requested frames to the transmitting station and receive the frames is determined (step 308). If the answer of the step 308 is N, the program ends. If the answer of the step 308 is Y, the program returns to the step 302.

As stated above, the above embodiment determines circuit quality based on circuit quality information and requests the transmitting station to shift down the transmission rate accurately. This insures receipt at a data rate matching the circuit conditions, reduces errors, increases the communication efficiency, and reduces the communication cost.

4th Embodiment

Figure 11:
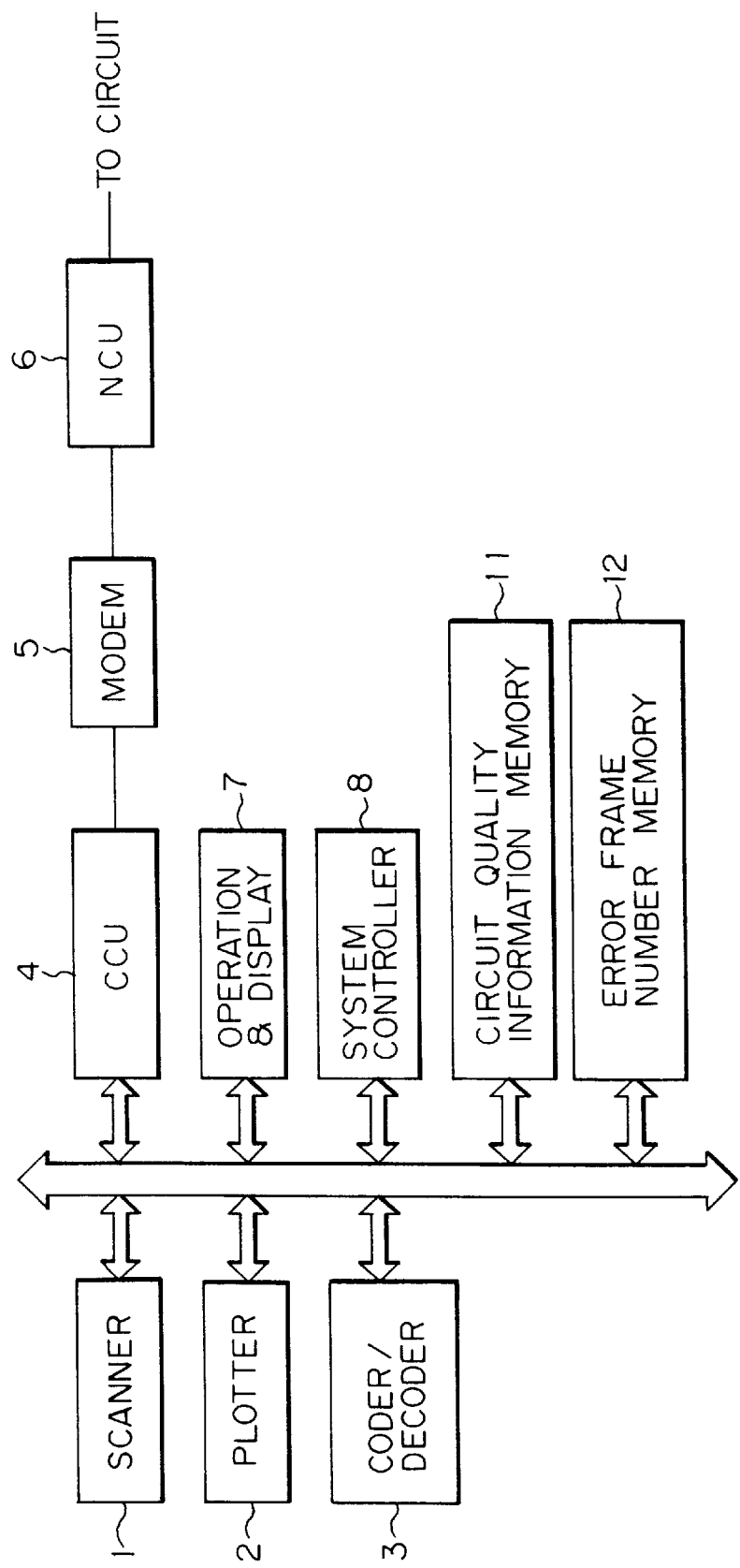
FIG. 11 is a block diagram schematically showing a fourth embodiment of the present invention.

FIG. 11 shows a fourth embodiment of the present invention similar to the third embodiment except that it additionally includes an error frame number memory 12. In the third embodiment, whether or not to shift down the transmission rate is determined on the basis of circuit quality information so as to enhance efficient communication. However, it may occur that some kind of image data can be successfully received despite the fall of circuit quality information, or that an error occurs in image data despite high circuit quality information.

In light of the above, the error frame number memory 12 stores the number of frames received during the receipt of image data and the number of frames which the receiving station requests the transmitting station to resend (number of error frames). If the ratio of the number of error frames to the total number of frames (error frame ratio) is greater than any suitable threshold, the embodiment shifts down the transmission rate even if the circuit quality represented by the information is high. If the error frame ratio is smaller than the threshold, the embodiment does not shift down the transmission ratio even if the value of the circuit quality information falls. For example, assume that five or more received frames are erroneous for ten requested frames. Then, the embodiment shifts down the transmission rate even if the value of the circuit quality information is high. If only two or less received frames are erroneous for the ten requested frames, the embodiment does not effect the shift-down although the circuit quality information may not be acceptable.

Figure 12A:
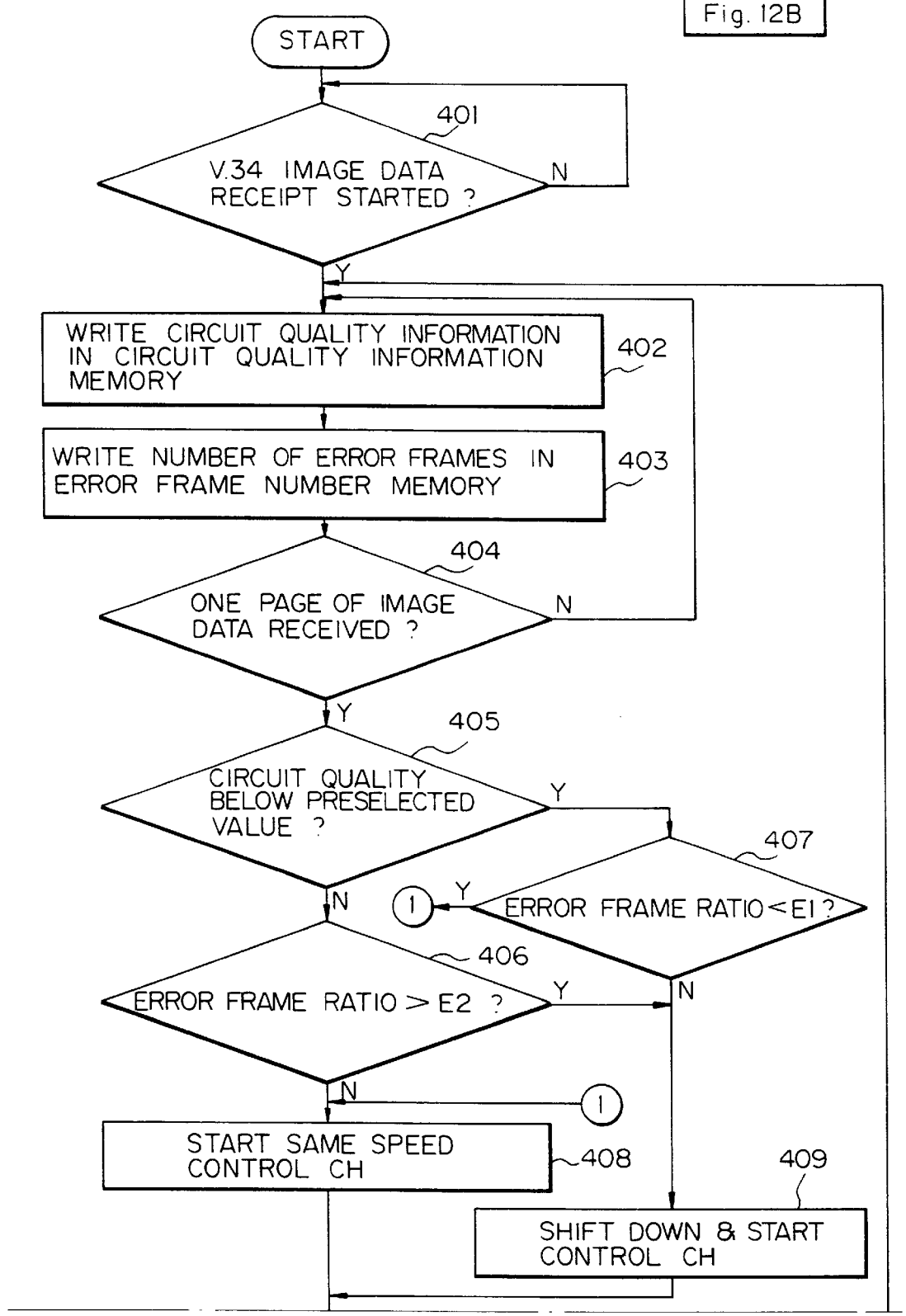
FIGS. 12A and 12B depict a flowchart demonstrating a specific operation of the fourth embodiment.
Figure 12B:
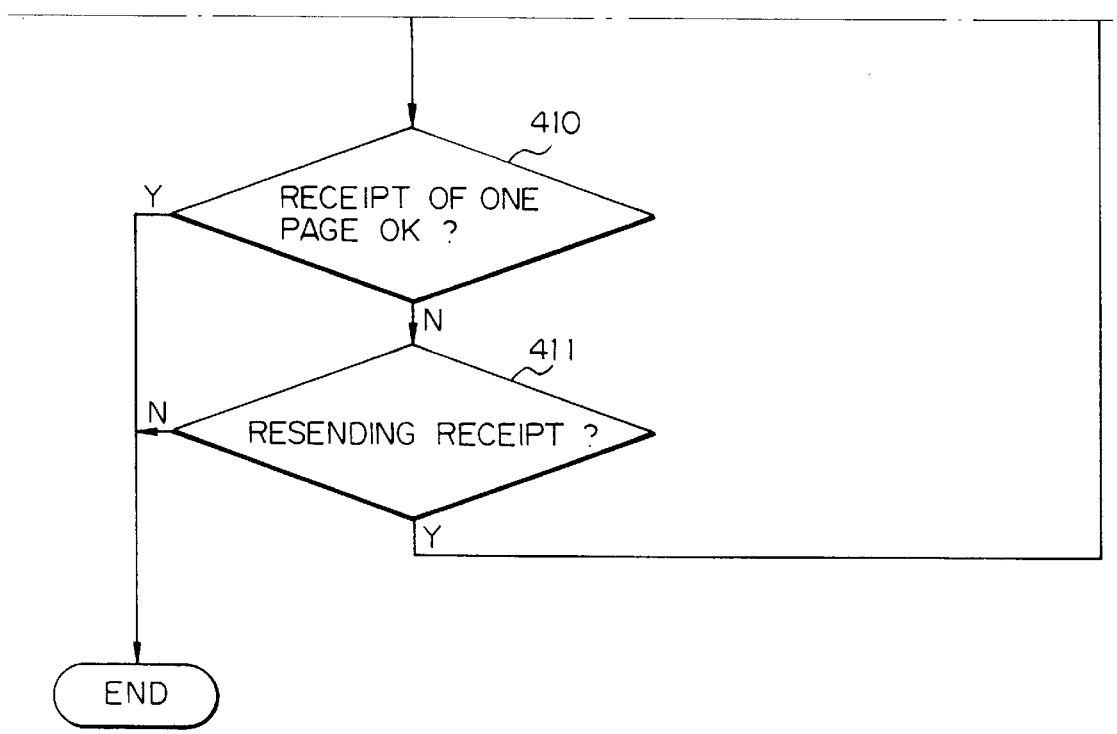

Referring to FIGS. 12A and 12B, a specific operation of the fourth embodiment will be described. As shown, when the receipt of image data based on Recommendation V.34 begins (Y, step 401), circuit quality information is read out of the modem 5 and then written to a circuit information memory 11 (step 402). In addition, the number of error frames that occurred during receipt is written to the error frame number memory 12 (step 403). The steps 402 and 403 are repeated until one page of image data have been received. When image data representative of one page are fully received (Y, step 404), the lowest channel quality value stored in the memory 11 is read out and then compared with a preselected threshold. Whether or not to execute a shift-down procedure is determined on the basis of the result of comparison (step 405). If the circuit quality is not lower than the threshold (N, step 405), whether or not the error frame ratio is higher than a preselected threshold E2 (e.g. 50%) is determined (step 406). If the answer of the step 405 is Y, whether or not the error frame ratio is short of another preselected threshold E1 (e.g. 20%) is determined (step 407).

If the circuit quality is not lower than the preselected value and if the error frame ratio is not higher than the threshold E2 (N, step 406), a control channel protocol begins at the same data rate (step 408). However, if the error frame ratio is higher than the threshold E2 (Y, step 406), a preselected shift-down procedure is executed, and then the control channel protocol begins (step 409). On the other hand, if the circuit quality is short of the threshold (Y, step 405) and if the error frame ratio is higher than the threshold E1 (N, step 407), the shift-down procedure is executed, and the control channel protocol begins (step 409). However, if the error frame ratio is lower than the threshold E1 (Y, step 407), the control channel protocol begins at the same data rate (step 408).

After the start of the control protocol at the step 406 or 409, whether or not the one page of image data have been successfully received is determined (step 410). If the answer of the step 410 is Y, the receipt of the page ends. If the answer of the step 410 is N, whether or not the receiving station can send a PPR signal indicative of requested frames to the transmitting station and receive the frames is determined (step 411). If the answer of the step 411 is N, the program ends. If the answer of the step 411 is Y, the program returns to the step 402.

As stated above, the embodiment allows the receiving station to determine whether or not to shift down the transmission rate on the basis of the circuit quality information and error frame ratio. Therefore, the receiving station can receive image data at a data rate more suiting the circuit conditions. This further enhances efficient communication and further lowers the communication cost.

The first and second embodiments are each implemented as a transmitting station while the third and fourth embodiments are each implemented as a receiving station. Of course, the transmission procedure and the receiving procedure may be replaced with each other.

In the first to fourth embodiments, the memories are each shown as being an independent unit for facilitating the understanding of the configuration. Generally, however, the system controller 8 has a ROM (Read Only Memory) area storing a program to be executed by a CPU (Central Processing Unit), and a RAM (Random Access Memory) area or work area. The memory of each embodiment may therefore be implemented by the RAM area of the system controller 8.

5th Embodiment

Figure 13B:
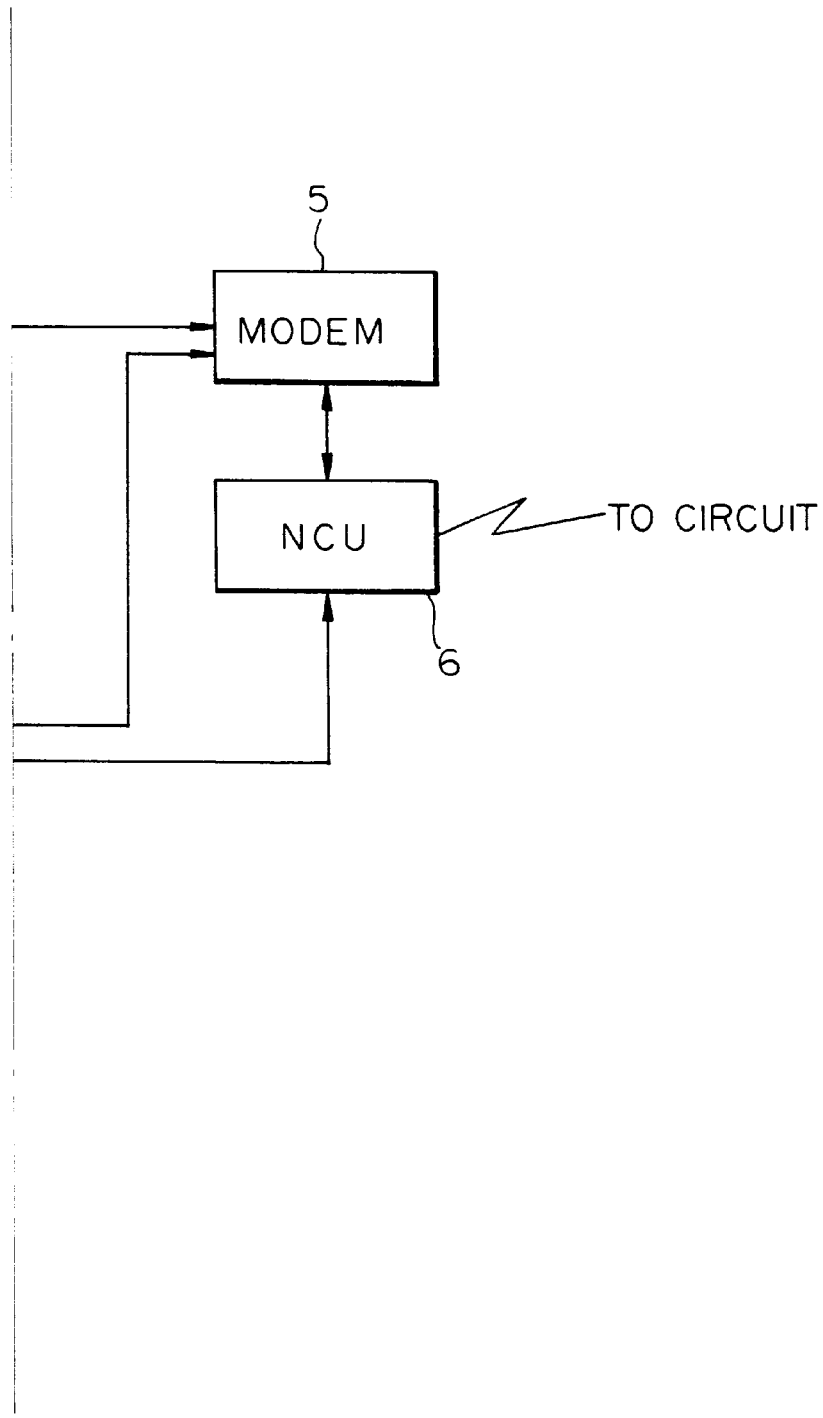

Referring to FIG. 13, a fifth embodiment of the present invention includes the system controller 8 for controlling the entire apparatus in accordance with a program stored therein. The operation and display panel 7 includes a keyboard for allowing the operator to input various commands, and display means for displaying, e.g., messages meant for the operator. A RAM 13 is used to store image data and other data temporarily therein. The scanner 1 reads image data out of a document. Received image data are decoded by the coder/decoder 3 and then output by the plotter 2 via the RAM 13. The NCU 6 sets up a call between the apparatus and a remote facsimile apparatus via the telephone network. The CCU 4 controls the interchange of facsimile data in accordance with the G3 transmission control procedure. The modem 5 is made up of a low-speed modem and a high-speed modem. An image memory 14 stores image data. A parameter memory 15 stores control data and is backed-up by a battery in case of power shut-off.

The CCU 4 includes circuit condition monitoring means 4A and image data managing means 4B. The circuit condition monitoring means 4A monitors circuit conditions which may change signals, while the image data managing means 4B monitors received image data to see if they include errors. The system controller 8 includes rate change requesting means 8A for sending, based on the output of the circuit condition monitoring means 4A as well as other outputs, a shift-down or shift-up request signal to the transmitting station. The circuit condition monitoring means 4A is constituted by the modem 5 and a CPU and ROM included in the CCU 4. The image data managing means 4B and rate change requesting means 8A are respectively constituted by the CPU and ROM of the CCU 4 and those of the system controller 8. The high-speed modem forming a part of the modem 5 is a V.34 modem.

Figure 14A:
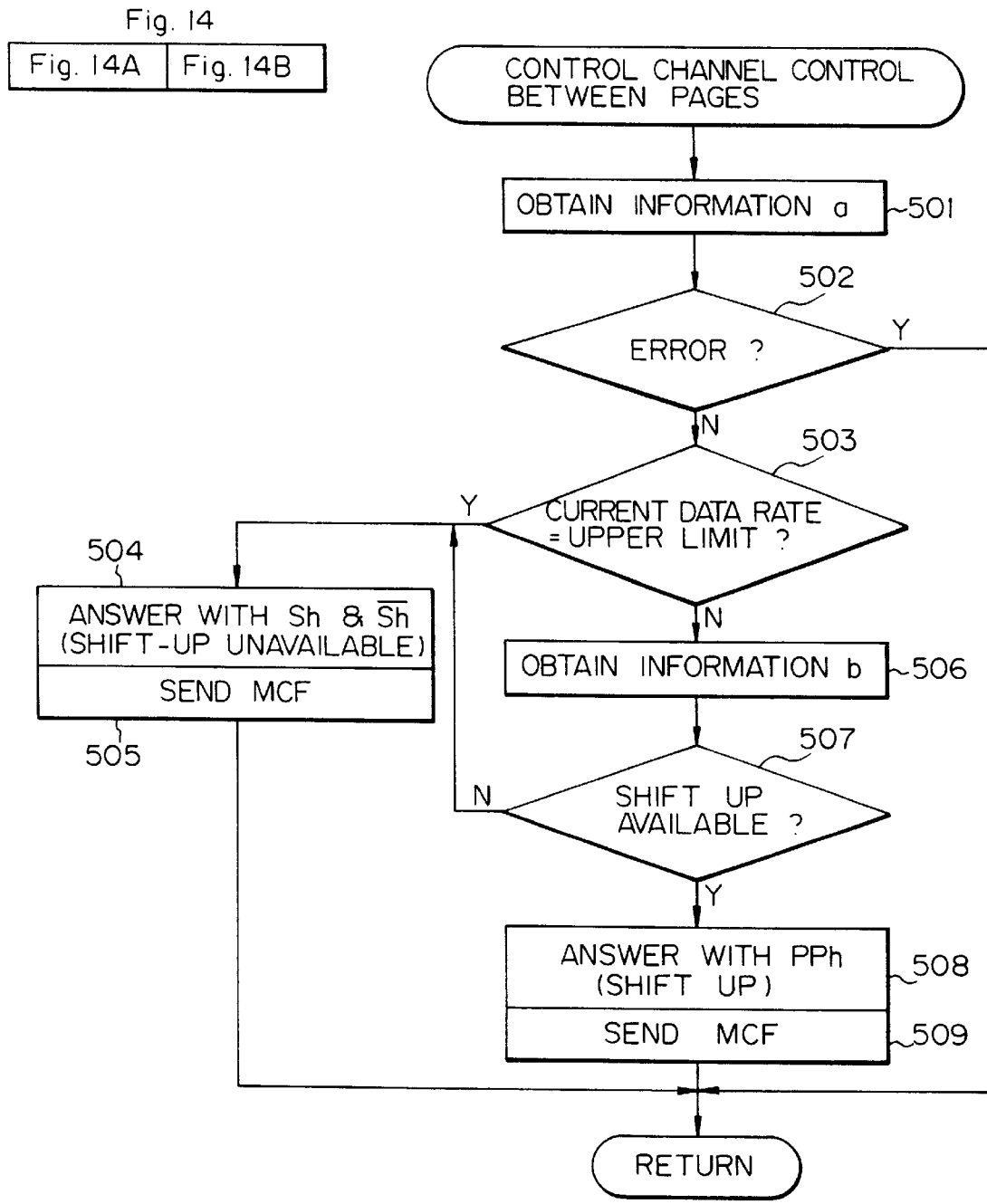
FIGS. 14A and 14B depict a flowchart demonstrating a specific operation of the fifth embodiment.
Figure 14B:
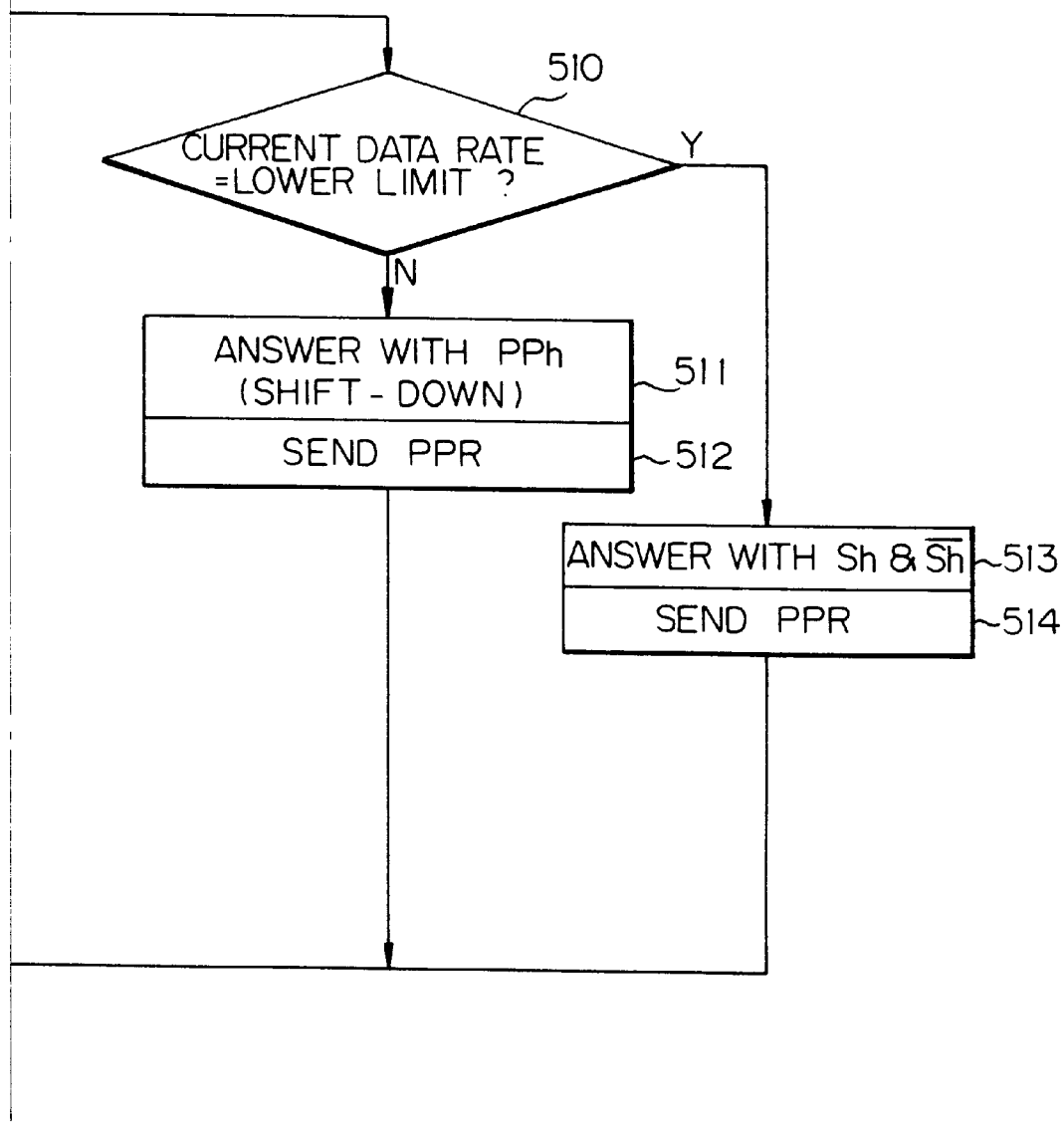
Figure 15:
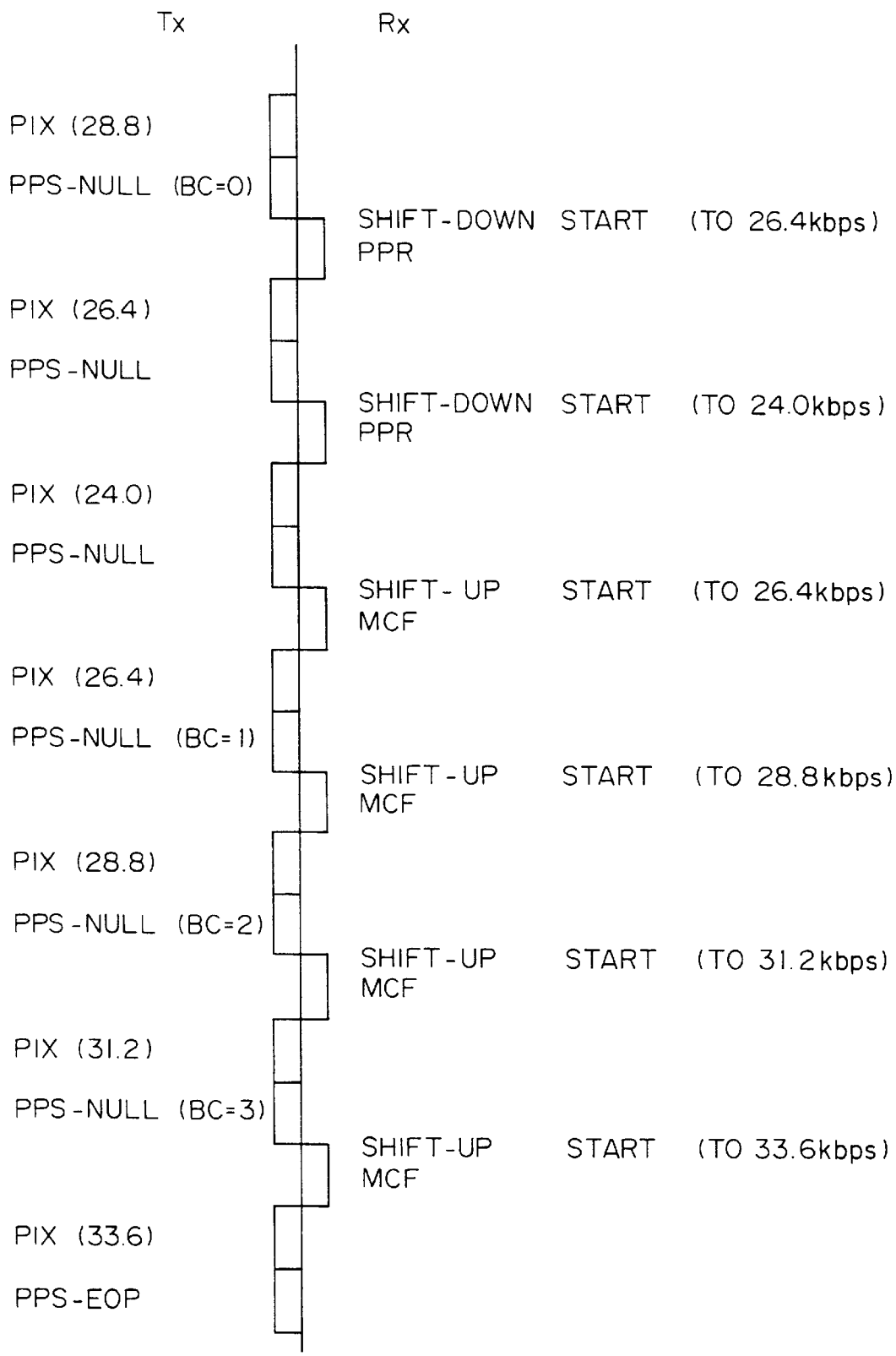
FIG. 15 shows a transmission control procedure particular to the fifth embodiment.

FIGS. 14A and 14B show a specific operation of the fifth embodiment while FIG. 15 outlines a transmission control procedure. The operation of FIG. 14 begins after the start of communication in ECM based on the G3 control procedure, and the entry into Phase C. Assume that a transmitting station Tx sends the first block (BC=0) of image data PIX at a rate of 28.8 kbps.

Figure 16:
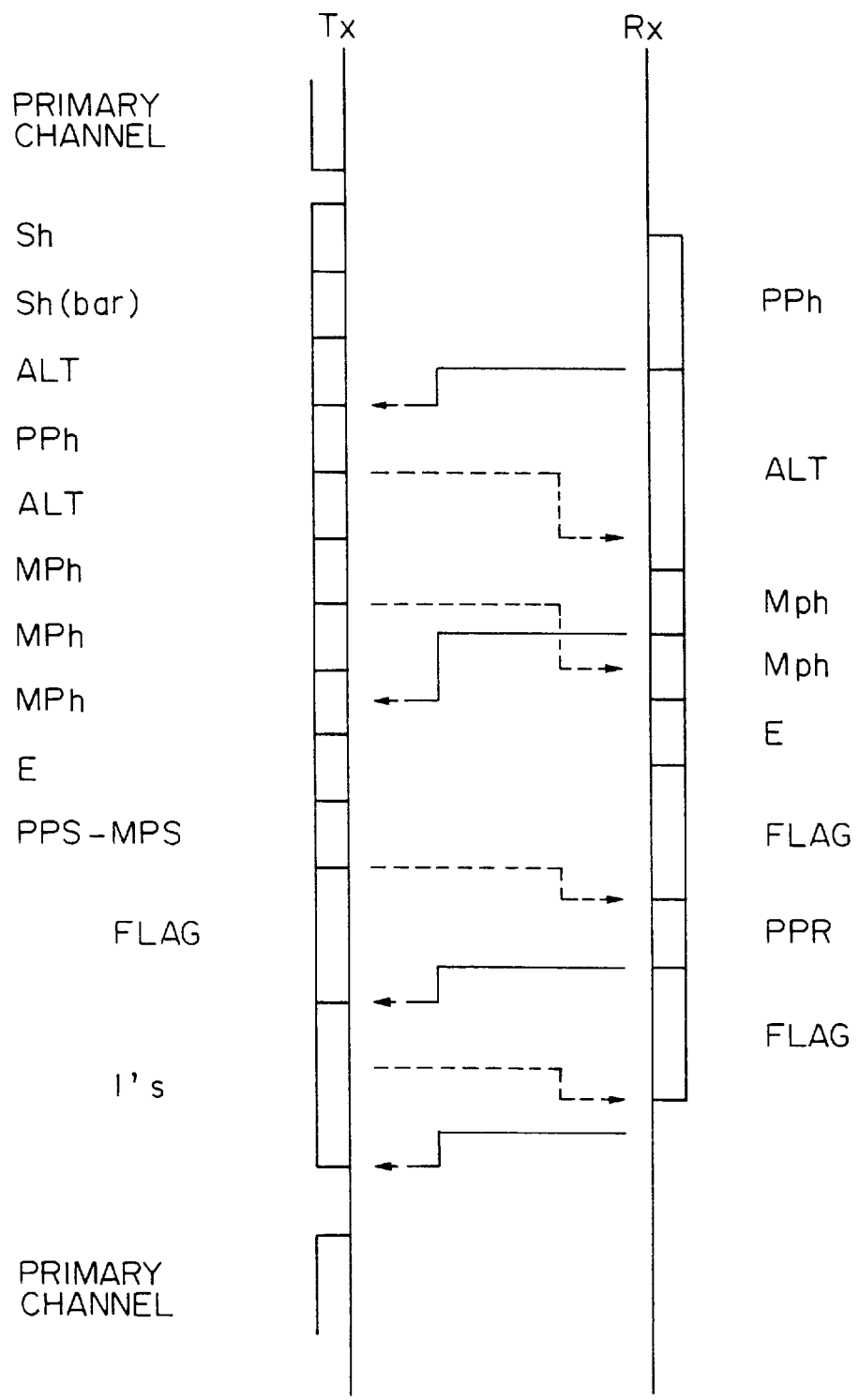
FIG. 16 shows a transmission control procedure to be executed by an essential part of the fifth embodiment.

FIG. 16 shows a sequence supplementary to the G3 transmission control procedure. In FIG. 16, primary channel data refer to image data (PIX and PPS-NULL) shown in FIG. 15. Specifically, the transmitting station Tx sequentially sends the first block of image data, an Sh signal and an Sh (bar) signal opposite in phase to the Sh signal, and an ALT signal and a PPh signal for training.

On receiving the Sh and Sh(bar) signals, the modem 5 included in a receiving station Rx sends a PPh signal so as to start training. At the same time, the rate change requesting means 8A of the system controller 8 obtains from the image data managing means 4B information a indicative of whether or not an error has occurred in the received image data (step 501, FIG. 14). That is, the image data managing means 4B monitors the first block of image data being received to see if an error appears therein.

The rate change requesting means 8A determines whether or not an error has occurred in the received image data on the basis of the information a (step 502). If the answer of the step 502 is Y, the requesting means 8A determines whether or not the current transmission rate is the lower limit (step 510). For this purpose, the requesting means 8A references a preselected area of the RAM 13 storing the current transmission rate set up between the two stations Rx and Tx before the receipt of the image data. In the specific procedure of FIG. 15, the transmission rate is 28.8 kbps, so that the answer of the step 510 is N. As a result, the requesting means 8A requests the CCU 4 to shift down the transmission rate (see FIG. 15).

The modem 5 of the receiving station Rx sends an ALT signal after the PPh signal (see FIG. 16). The CCU 4 sends an MPh signal so set as to shift down the transmission rate to 26.4 kbps (step 511; see FIG. 16). If the receiving station Rx does not receive the MPh signal from the transmitting station Tx, the CCU 4 sends the same MPh signal a plurality of times. That is, although the transmitting station Tx also sends the MPh signal, the transmission rate set by this signal is still held at 28.8 kbps. In this manner, the two stations Tx and Rx send a signal E to each other and then return to the G3 transmission control procedure. The transmitting station Tx sends a PPS-MPS signal while the receiving station Rx sends a PPR signal in order to request resending (step 512) (see FIGS. 15 and 16).

Consequently, the transmitting station Tx resends the first block of image data (BC=0) to the receiving station Rx at the rate of 26.4 kbps. In the specific case shown in FIG. 15, even the image data resent to the receiving station Rx include an error. Therefore, the supplementary procedure of FIG. 16 is again executed in order to request the transmitting station Tx to shift down the transmission rate to 24.0 kbps.

In response, the transmitting station Tx again sends the first block of image data at the requested rate of 24.0 kbps (see FIG. 15). If the first block received this time is free from errors (N, step 502), the rate change requesting means 8A determines whether or not the current transmission rate is the upper limit (step 503). If the answer of the step 503 is N, as in the case shown in FIG. 15, the requesting means 8A obtains circuit condition information b from the circuit condition monitoring means 4A (step 506). The circuit condition information b may be an EQM (Eye Quality Monitor) value representative of the degree of convergence of a modem. The EQM value reflects a channel condition because the degree of convergence decreases with a decrease in, e.g., waveform distortion ascribable to noise. Moreover, the EQM value is reliable because waveform distortion and other occurrences sequentially accumulate on the EQM value during the receipt of image data. This is in contrast to a decision of determining that the circuit condition is poor if even a single bit is erroneous by accident.

Figure 17:
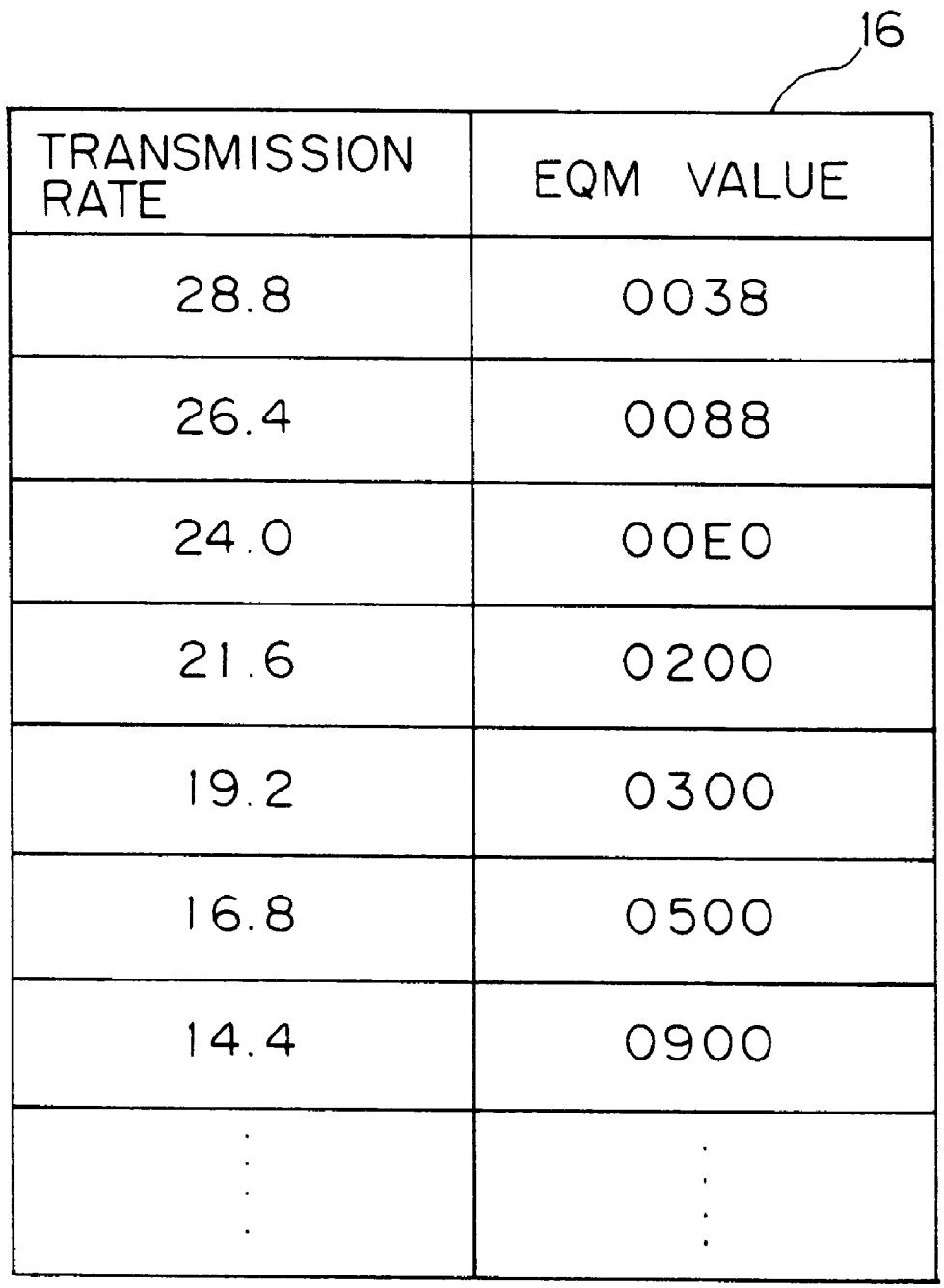
FIG. 17 shows a table included in the fifth embodiment and listing specific data.

The rate change requesting means 8A stores in the parameter memory 15 a transmission rate table 16 shown in FIG. 17. The table 16 lists transmission rates and EQM values in one-to-one correspondence. For example, when the EQM value is smaller than 00E0 (hexadecimal) inclusive, communication will be successful if a transmission rate of 24 kbps is set up. This, however, does not mean that an error will not occur at all.

If the obtained EQM value is 0041 by way of example, the transmission rate can be shifted up to 26.4 kbps. In such a case (Y, step 507), the rate change requesting means 8A commands the CCU 4 to shift up the rate to 26.4 kbps. In response, the CCU 4 sends a PPh signal, sets up the commanded rate on the MPh signal (see FIG. 16), and sends the MPh signal (step 508). Because no errors have occurred, the CCU 4 sends an MCF signal (see FIG. 16) in place of a PPR signal (step 509; see FIG. 15).

Assume that the blocks following the first block have been received without any error (N, step 502). Then, if the transmission rate is not the upper limit (N, step 503) and if the EQM value can be shifted up (Y, step 507), the CCU 4 requests the transmitting station Tx to shift up the transmission rate by one step every time one block of image data are received (step 508), and then sends an MCF signal (step 509; see FIG. 15).

If the current transmission rate is the upper limit available with the modem of the transmitting station Tx or the receiving station Rx (Y, step 503), the CCU 4 sends Sh and Sh(bar) signals in place of the PPh signal (step 504), and then sends ALT and E signals (MPh signal not needed) (see FIG. 16). Subsequently, the CCU 4 sends an MCF signal because no errors have occurred (step 505). So long as the EQM value cannot be shifted up (N, step 507), the transmission rate is not changed even if the transmission rate is the upper limit (N, step 503). Then, the program advances to the step 504.

If an error has occurred (Y, step 502) and if the current transmission rate is the lower limit (Y, step 510), the CCU 4 sends Sh and Sh(bar) signals in place of the PPh signal (step 504), and then sends ALT and E signals (MPh signal not needed) (see FIG. 16). Thereafter, the CCU 4 sends a PPR signal because an error has occurred (step 514).

As stated above, this embodiment allows the receiving station Rx to shift down or shift up the transmission rate in matching relation to circuit conditions by its own decision.

6th Embodiment

Figure 18:
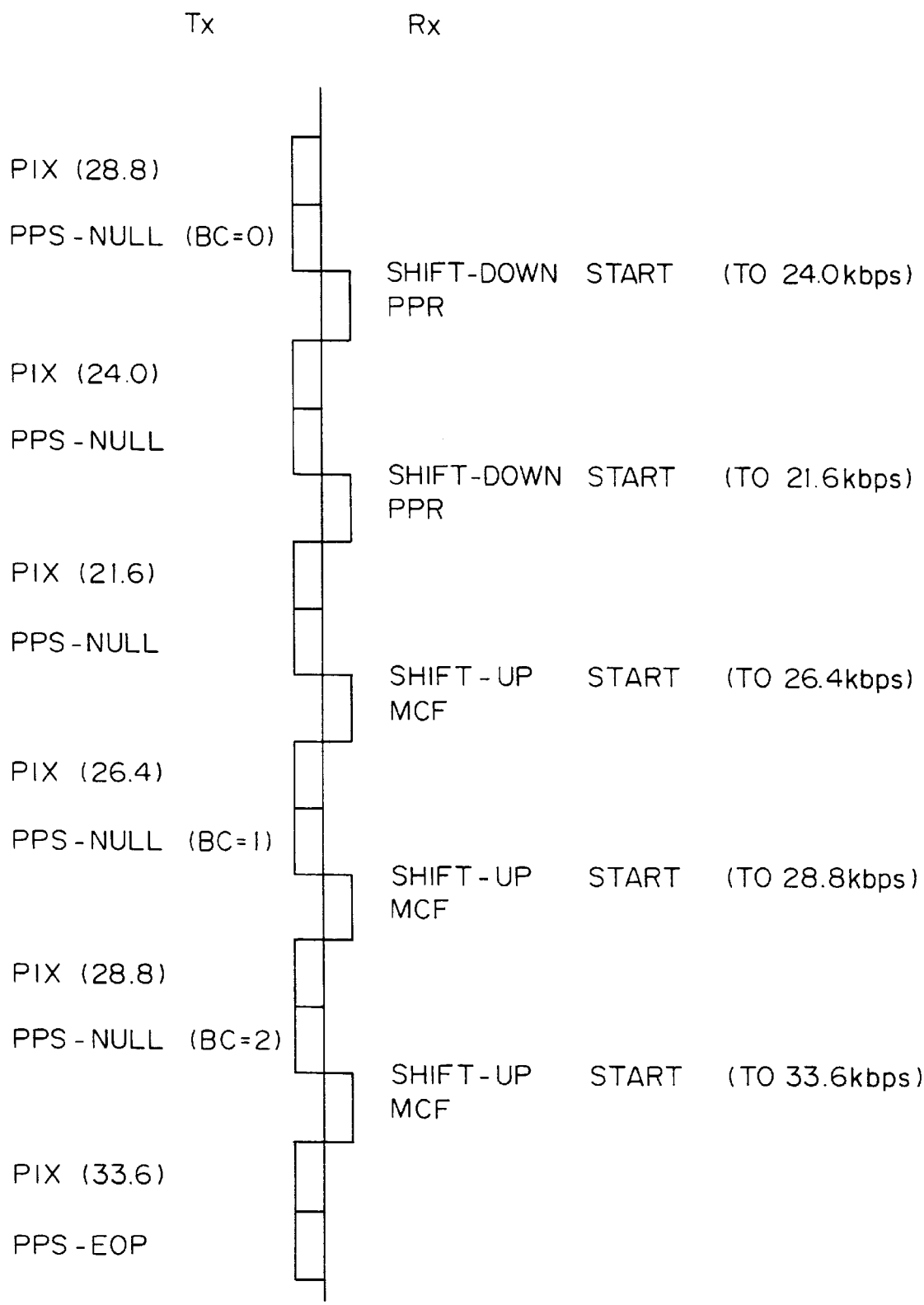
FIG. 18 shows a transmission control procedure representative of a sixth embodiment of the present invention.

FIG. 18 shows a transmission control procedure representative of a sixth embodiment of the present invention. As shown, this embodiment shifts up or shifts down the transmission rate by a plurality of steps at a time. For example, assume that an error occurs in the receiving station Rx when image data PIXW are sent at a rate of 28.8 kbps, and that the current EQM value is 00B0 (hexadecimal). Then, the rate change requesting means 8A requests the CCU 4 to shift down the transmission rate to 24.0 kbps instead of 26.4 kbps. Also, assume that no error have been detected when image data are sent at a rate of 21.6 kbps, and that the current EQM value is 0070 (hexadecimal). Then, the requesting means 8A requests the CCU 4 to shift up the transmission rate to 26.4 kbps instead of 24.0 kbps.

As stated above, when the circuit condition is poor, this embodiment can set up a transmission rate matching the circuit condition immediately. This reduces the number of times of resending. Further, when the circuit condition is acceptable, the embodiment sets up a transmission rate matching such a circuit condition and thereby increases the mean communication rate.

The fifth and sixth embodiment described above have the following advantages.

(1) After or during the receipt of one page of image data, a receiving station can request a transmitting station to shift down or shift up a transmission rate on the basis of a circuit condition being monitored. This successfully increases the facsimile communication rate and reliability.

(2) The receiving station requests the transmitting station to shift down the transmission rate when the EQM value increases or to shift it up when the EQM value decreases. Therefore, the transmission rate reflects the circuit condition more accurately.

(3) A transmission rate matching a circuit condition is set up immediately, reducing errors in a poor circuit condition. So long as the channel condition is desirable, the transmission rate is shifted up immediately so as to increase the mean transmission rate.

(4) The transmission rate is shifted down when an error occurs in received image data and when the circuit condition is poor. The rate is shifted up if the image data is free from errors and if the circuit condition is desirable. This further enhances the communication rate and reliability, depending on the situation.

Various modifications will become possible for those skilled in the art after receiving the teachings of the present disclosure without departing from the scope thereof.

What is claimed is:

1. A facsimile apparatus including a modem for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, the modem uses a protocol allowing one of the transmitting side and the receiving side to execute a procedure for changing a communication rate, the facsimile apparatus comprising:

data rate detecting means for detecting the data rate when resending frames including an error;

counting means for counting a number of times of resending at a same data rate;

determining means for determining whether the number of times of resending at the same data rate has been repeated a preselected number of times;

frame number detecting means for detecting a number of frames requested to be sent and a number of error frames requested to be resent;

frame number comparing means for comparing the number of error frames to the number of frames requested to be sent in order to determine an error frame ratio of the number of error frames to the number of frames requested to be sent; and control means for executing the procedure for changing the communication rate when the number of times of resending at the same data rate has been repeated the preselected number of times and when the error frame ratio is greater than a preselected value.

2. A facsimile apparatus including a modem for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, the modem uses a protocol allowing one of the transmitting side and the receiving side to execute a procedure for changing a communication rate, the facsimile apparatus comprising:

reading means for reading information stored in the modem relating to circuit quality of the communication circuit at preselected intervals while a circuit information memory is sequentially updated with an Eye Quality Monitor value, wherein the Eye Quality Monitor value corresponds to a waveform distortion condition of the primary channel;

determining means for determining the circuit quality of the communication circuit based on the information stored in the modem;

comparing means for comparing the Eye Quality Monitor value stored in the circuit information memory to a preselected value; and control means for executing the procedure for changing the communication rate when the Eye Quality Monitor value is greater than the preselected value.

3. The facsimile apparatus as recited in claim 2, further comprising:

error frame number detecting means for detecting a first number of frames included in the image data having an error to be resent by the transmitting side; and frame number comparing means for determining an error frame ratio of the first number of frames and a second number of frames requested to be sent, wherein the control means executes the procedure for changing the communication rate when the Eye Quality Monitor value of the communication circuit is greater than the preselected value and the error frame ratio is greater than a second preselected value.

4. A facsimile apparatus for performing facsimile communication based on a G3 standard transmission control procedure and a supplementary procedure, the facsimile apparatus comprising:

circuit condition monitoring means for monitoring during receipt of image data by a receiver side a circuit condition including a plurality of Eye Quality Monitor values, wherein each of the plurality of Eye Quality Monitor values corresponds to a waveform distortion condition of a transmission channel;

image data managing means for monitoring the image data received by the receiver side for an error; and rate change requesting means for sending from the receiving side to a transmitting side, at any time during or after receipt of a page of the image data, a signal for requesting one of a shift-down and a shift-up of a transmission rate based on an output of the circuit condition monitoring means, wherein the circuit condition monitoring means monitors the circuit condition in terms of one of the plurality of Eye Quality Monitor values, and the rate change requesting means one of requests the shift-down of the transmission rate when the one of the plurality of Eye Quality Monitor values increases to an upper limit and requests the shift-up of the transmission rate when the one of the plurality of Eye Quality Monitor values decreases to a lower limit.

5. The facsimile apparatus as recited in claim 4, further comprising:

a transmission rate table listing the plurality of Eye Quality Monitor values and corresponding transmission rates, wherein the rate change requesting means requests one of the shift-down of the transmission rate and the shift-up of the transmission rate by at least one step in accordance with the transmission rate corresponding to the one of the plurality of Eye Quality Monitor values obtained from the circuit condition monitoring means.

6. The facsimile apparatus as recited in claim 4, wherein the rate change requesting means one of starts a shift-down request procedure when an error occurs in the received image data and starts a shift-up request procedure when an error does not occur in the received image data.

7. A facsimile method for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, a modem uses a protocol allowing one of the transmitting side and the receiving side to execute a procedure for changing a communication rate, the facsimile method comprising the steps of:

detecting the data rate when resending frames including an error;

counting a number of times of resending at a same data rate;

determining whether the number of times of resending at the same data rate has been repeated a preselected number of times;

detecting a number of frames requested to be sent and a number of error frames requested to be resent;

comparing the number of error frames sent to the number of frames requested to be sent in order to determine an error frame ratio of the number of error frames to the number of frames requested to be sent; and executing the procedure for changing the communication rate when the number of times of resending at the same data rate has been repeated the preselected number of times and when the error frame ratio is greater than a preselected value.

8. A facsimile method for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, a modem uses a protocol allowing one of the transmitting side and the receiving side to execute a procedure for changing a communication rate, the facsimile method comprising the steps of:

reading information stored in the modem relating to circuit quality of the communication circuit at preselected intervals while a circuit information memory is sequentially updated with an Eye Quality Monitor value, wherein the Eye Quality Monitor value corresponds to a waveform distortion condition of the primary channel;

determining the circuit quality of the communication circuit based on the information stored in the modem;

comparing the Eye Quality Monitor value stored in the circuit information memory to a preselected value; and executing the procedure for changing the communication rate when the Eye Quality Monitor value is greater than the preselected value.

9. The facsimile method as recited in claim 8, further comprising the steps of:

detecting a first number of frames included in the image data having an error to be resent by the transmitting side; and determining an error frame ratio of the first number of frames and a second number of frames requested to be sent, wherein the step of executing the procedure for changing the communication rate is performed when the Eye Quality Monitor value of the communication circuit is greater than the preselected value and the error frame ratio is greater than a second preselected value.

10. A facsimile method for performing facsimile communication based on a G3 standard transmission control procedure and a supplementary procedure, the facsimile method comprising the steps of:

monitoring during receipt of image data by a receiver side a circuit condition including a plurality of Eye Quality Monitor values, wherein each of the plurality of Eye Quality Monitor values corresponds to a waveform distortion condition of a transmission channel;

monitoring the image data received by the receiver side for an error; and sending from the receiving side to a transmitting side, at any time during or after receipt of a page of the image data, a signal for requesting one of a shift-down and a shift-up of a transmission rate based on an output of the step of monitoring the circuit condition, wherein the step of monitoring the circuit condition monitors in terms of one of the plurality of Eye Quality Monitor values, and the step of sending the signal for requesting one of a shift-down and a shift-up one of requests the shift-down of the transmission rate when the one of the plurality of Eye Quality Monitor values increases to an upper limit and requests the shift-up of the transmission rate when the one of the plurality of Eye Quality Monitor values decreases to a lower limit.

11. The facsimile method as recited in claim 10, further comprising the step of:

listing the plurality of Eye Quality Monitor values and corresponding transmission rates, wherein the step of sending the signal for requesting one of the shift-down and the shift-up requests one of the shift-down of the transmission rate and the shift-up of the transmission rate by at least one step in accordance with the transmission rate corresponding to the one of the plurality of Eye Quality Monitor values obtained from the step of monitoring the circuit condition.

12. The facsimile method as recited in claim 10, wherein the step of sending the signal for requesting one of the shift-down and the shift-up of the transmission rate one of starts a shift-down request procedure when an error occurs in the received image data and starts a shift-up request procedure when an error does not occur in the received image data.

13. A facsimile system including a modem for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, the modem uses a protocol allowing one of the transmitting side and the receiving side to execute a procedure for changing a communication rate, the facsimile system comprising:

a data rate detector for detecting the data rate when resending frames including an error;

a counter for counting a number of times of resending at a same data rate detected by the data rate detector;

a determinator for determining whether the number of times of resending at the same data rate determined by the counter has been repeated a preselected number of times;

a frame number detector for detecting a number of frames requested to be sent and a number of error frames requested to be resent;

a frame number comparator for comparing the number of error frames sent to the number of frames requested to be sent, as detected by the frame number detector, in order to determine an error frame ratio of the number of error frames to the number of frames requested to be sent; and a controller for executing the procedure for changing the communication rate when the determinator determines that the number of times of resending at the same data rate has been repeated the preselected number of times and when the frame number comparator determines that the error frame ratio is greater than a preselected value.

14. A facsimile system including a modem for determining a data rate for image data communication in accordance with a transmission quality of a communication circuit, wherein at a beginning of a control channel for allowing a transmitting side and a receiving side to interchange control signals including an error frame resending function and following a primary channel assigned to the image data communication, the modem uses a protocol allowing one of the transmitting side and the receiving side to execute a procedure for changing a communication rate, the facsimile system comprising:

a reader for reading information stored in the modem relating to circuit quality of the communication circuit at preselected intervals;

a circuit information memory for storing the information read by the reader and sequentially updated with a an Eye Quality Monitor value, wherein the Eye Quality Monitor value corresponds to a waveform distortion condition of the primary channel;

a determinator for determining the circuit quality of the communication circuit based on the information stored in the circuit information memory;

a comparator for comparing the Eye Quality Monitor value stored in the circuit information memory to a preselected value; and a controller for executing the procedure for changing the communication rate when the Eye Quality Monitor value stored in the circuit information memory is greater than the preselected value.

15. The facsimile system as recited in claim 14, further comprising:

an error frame number detector for detecting a first number of frames included in the image data having an error to be resent by the transmitting side; and a frame number comparator for determining an error frame ratio of the first number of frames and a second number of frames requested to be sent detected by the error frame number detector, wherein the controller executes the procedure for changing the communication rate when the Eye Quality Monitor value of the communication circuit is greater than the preselected value and the error frame ratio determined by the frame number comparator is greater than a second preselected value.

16. A facsimile system for performing facsimile communication based on a G3 standard transmission control procedure and a supplementary procedure, the facsimile system comprising:

a circuit condition manager for monitoring during receipt of image data by a receiver side a circuit condition including a plurality of Eye Quality Monitor values, wherein each of the plurality of Eye Quality Monitor values corresponds to a waveform distortion condition of a transmission channel;

an image data manager for monitoring the image data received by the receiver side for an error; and a rate change requestor for sending from the receiving side to a transmitting side, at any time during or after receipt of a page of the image data, a signal for requesting one of a shift-down and a shift-up of a transmission rate based on an output of the circuit condition manager, wherein the circuit condition manager monitors the circuit condition in terms of one of the plurality of Eye Quality Monitor values, and the rate change requestor one of requests the shift-down of the transmission rate when the one of the plurality of Eye Quality Monitor values increases to an upper limit and requests the shift-up of the transmission rate when the one of the plurality of Eye Quality Monitor values decreases to a lower limit.

17. The facsimile system as recited in claim 16, further comprising:

a transmission rate table listing the plurality of Eye Quality Monitor values and corresponding transmission rates, wherein the rate change requestor requests one of the shift-down of the transmission rate and the shift-up of the transmission rate by at least one step in accordance with the transmission rate corresponding to the one of the plurality of Eye Quality Monitor values obtained from the circuit condition manager.

18. The facsimile system as recited in claim 16, wherein the rate change requestor one of starts a shift-down request procedure when the image data manager determines that an error has occurred in the received image data and starts a shift-up request procedure when an error has not occurred in the received image data.

* * * * *